US011727287B2

(12) United States Patent
Banis et al.

(10) Patent No.: US 11,727,287 B2
(45) Date of Patent: *Aug. 15, 2023

(54) MULTI-CLIENT SERVICE SYSTEM PLATFORM

(71) Applicant: HubSpot, Inc., Cambridge, MA (US)

(72) Inventors: George Banis, Cambridge, MA (US); Adam Starikiewicz, Dublin (IE); Kevin M. Walsh, Somerville, MA (US); Stephen Purcell, Somerville, MA (US); Hector Urdiales, Dublin (IE); Andrea Bergonzo, Dublin (IE)

(73) Assignee: HubSpot, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 17/882,950

(22) Filed: Aug. 8, 2022

(65) Prior Publication Data
US 2022/0383199 A1 Dec. 1, 2022

Related U.S. Application Data

(63) Continuation of application No. 16/716,688, filed on Dec. 17, 2019, now Pat. No. 11,449,775.

(60) Provisional application No. 62/785,544, filed on Dec. 27, 2018.

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ............ G06N 5/04; G06N 20/00; G06N 5/01
See application file for complete search history.

(56) References Cited

U.S. PATENT DOCUMENTS

| 10,769,497 | B2 * | 9/2020 | Haneda ..................... G06N 3/08 |
| 10,990,850 | B1 * | 4/2021 | Chen .................. G06V 10/7747 |
| 11,257,002 | B2 * | 2/2022 | Faulhaber, Jr. ........ G06N 20/00 |
| 11,449,775 | B2 * | 9/2022 | Banis ........................ G06N 5/04 |
| 2019/0188615 | A1 * | 6/2019 | Liu .......................... G06N 20/20 |
| 2022/0269960 | A1 * | 8/2022 | Bernat ...................... G06N 5/04 |

* cited by examiner

*Primary Examiner* — Harry H Kim
(74) *Attorney, Agent, or Firm* — Cooper Legal Group, LLC

(57) ABSTRACT

A modular machine learning-as-a-service (MLAAS) system uses machine learning to respond to tasks without requiring machine learning modeling or design knowledge by its users. The MLAAS system receives an inference request including a model identifier and a target defining features for use in processing the inference request. The features correspond to a task for evaluation using a machine learning model associated with the model identifier. An inference outcome is generated by processing the inference request using the target as input to the model. Feedback indicating an accuracy of the inference outcome with respect to the task is later received and used to generate a training data set, which the MLAAS can use to further train model used to generate the inference outcome. As a result, the training of a machine learning model by the MLAAS system is limited to using data resulting from an inference performed using that model.

20 Claims, 13 Drawing Sheets

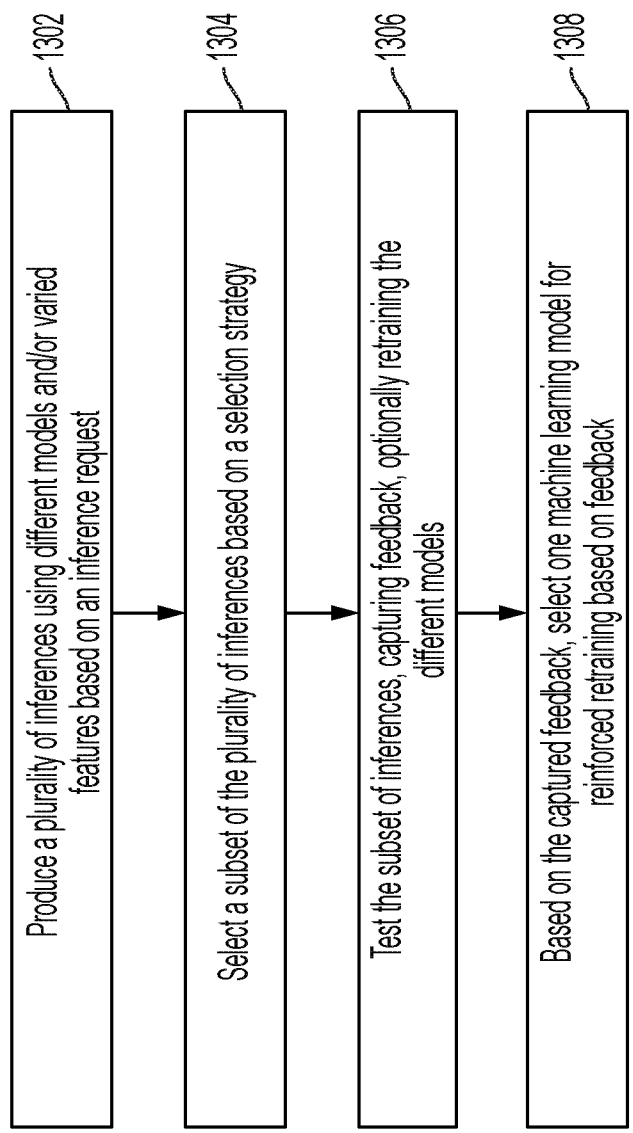

MULTI-CLIENT SERVICE SYSTEM PLATFORM

CROSS-REFERENCE TO RELATED APPLICATION(S)

This application claims priority to U.S. patent application Ser. No. 16/716,688, filed Dec. 17, 2019, entitled "Multi-Client Service System Platform,", which claims priority to U.S. Provisional Patent Application No. 62/785,544, filed Dec. 27, 2018, entitled "Multi-Client Service System Platform," which are hereby incorporated by reference.

TECHNICAL FIELD

This disclosure relates to machine learning, in particular, to a machine learning-as-a-service (MLAAS) system including methods and techniques performed using an MLAAS system.

BACKGROUND

Machine learning is a fast emerging, but still relatively-young technology. Conventionally, as more products integrate machine learning into their offerings, the focus of such integration has been on how to generate better machine learning models given a dataset. One issue with this approach, however, is the assumption that the data set is completely relevant and accurate. That is, the use of irrelevant and/or inaccurate training data to generate or update a machine learning model can reduce the efficacy of that model. Nevertheless, there has to date been a lack of focus on machine learning architectures for gathering and connecting better datasets to generate the models.

Developers integrating machine learning functionality within an offering, such as a software product, undergo the complicated and lengthy tasks of determining how to collect datasets, configure the datasets, validate data, determine features to extract, properly allocate computing resources, implement analysis and process management tools, develop a serving infrastructure that deploys the models, and monitor the performance of the deployed models. The integrations typically require developers to access storage systems across different services and platforms and to join data together to identify relevant features. Developers then provide labels to the features they consider desirable and create a model based thereon. The model is then deployed and performance is monitored.

Thus, the manual process of integrating machine learning functionality within a software product is complicated. The failure to correctly process the many data sets may result in suboptimal or otherwise inaccurate modeling. Accordingly, there is a need for a system that more efficiently generates models that are used for artificial intelligence-related tasks and products.

SUMMARY

Disclosed herein are, inter alia, embodiments of MLAAS systems, methodologies, techniques, and the like for training machine learning models and for performing inference using those models.

In one embodiment, a machine learning-as-a-service (MLAAS) system is provided. The MLAAS system comprises a data store and a cognitive processes system. The data store stores machine learning models processed using the cognitive processes system. The cognitive processes system performs inference and training for the machine learning models. In particular, the cognitive processes system receives an inference request including a model identifier and a target defining a set of features for use in processing the inference request from a computer. As used herein, target should be understood to encompass various features, feature sets, and the like except where context indicates otherwise. The set of features corresponds to a task for evaluation using one or more of the machine learning models associated with the model identifier. The cognitive processes system generates an inference outcome by processing the inference request using the target as input to the one or more machine learning models. The cognitive processes system transmits the inference outcome to the computer. After transmitting the inference outcome to the computer, the cognitive processes system receives feedback indicating an accuracy of the inference outcome with respect to the task from the computer. The cognitive processes system then trains the one or more machine learning models based on the feedback.

In another embodiment, a method is provided. The method comprises receiving, at an MLAAS system, a machine learning model generated without using training data. The method further comprises receiving, by a cognitive processes system of the MLAAS system, an inference request from a client. The inference request includes one or both of a request identifier or a target defining a set of features for use in processing the inference request. The method further comprises determining, by the cognitive processes system, an inference outcome by processing the target using the machine learning model. The method further comprises transmitting, from the MLAAS system, a response to the inference request to the client, the response to the inference request indicating the inference outcome. The method further comprises, after the response is transmitted to the client, receiving, at the MLAAS system, feedback from the client. The feedback includes one or both of the request identifiers or an outcome indicating an accuracy of the inference outcome with respect to a task associated with the inference request. The method further comprises generating, by the cognitive processes system, a training data set based on the inference request and the feedback. The method further comprises training, by the cognitive processes system, the machine learning model using the training data set.

In yet another embodiment, a method is provided. The method comprises receiving, at an MLAAS system, an inference request from a software product. The inference request includes a model identifier and a target, the model identifier associated with one or more machine learning models. The target defines a set of features for use in processing the inference request. The method further comprises determining, by an enhancement system of the MLAAS system, to use one or more additional features for processing the inference request based on the model identifier. The one or more additional features are related to at least one of the features in the set of features. The method further comprises retrieving, by the enhancement system, the one or more additional features from one or more data sources. The method further comprises enhancing, by the enhancement system, the target by including the retrieved one or more additional features within the set of features. The method further comprises determining, by a cognitive processes system of the MLAAS system, an inference outcome by processing the enhanced target using the one or more machine learning models. The method further comprises transmitting, from the MLAAS system, a response to the inference request to the software product. The response to the inference request indicates the inference outcome. The method further comprises, after the response is transmitted to the software product, receiving, at the MLAAS system, feedback from the software product. The feedback includes an outcome indicating an accuracy of the inference outcome with respect to a task associated with the inference request. The method further comprises generating, by the cognitive processes system, a training data set based on the enhanced target and the outcome. The method further comprises training, by the cognitive processes system, the machine learning model using the training data set.

In embodiments, a machine learning-as-a-service (MLAAS) system may include a data store that stores machine learning models and a cognitive processes system configured for inference and training of the machine learning models. The MLAAS system may receive an inference request including a model identifier and a target defining a set of features for use in processing the inference request, wherein the set of features correspond to a task for evaluation using one or more machine learning models, from the data store, associated with the model identifier. The inference request may be received from a computer. The MLAAS system may further determine, based on the model identifier one or more additional features for processing the inference request, wherein the one or more additional features are related to at least one of the features in the set of features. The additional features may be retrieved from one or more data sources. The MLAAS system may generate an inference outcome by processing the inference request using the target and the one or more additional features as input to the one or more machine learning models, followed by transmitting the inference outcome to the computer. Additionally, the MLAAS system may include training the one or more machine learning models based on feedback resulting from the transmitting, the feedback indicating one of an accuracy of the inference outcome with respect to the task received by the cognitive processes system and a default feedback based on the task.

In embodiments, the data store is a model data store, and the MLAAS system also includes a training data data store that stores a training data set used by the cognitive processes system to train the one or more machine learning models, wherein a training data set corresponding to the inference request includes the feedback. In embodiments, the training data set further includes an indication of a version of the one or more machine learning models used to generate the inference outcome. Training the one or more machine learning models based on the feedback may include training the version of the one or more machine learning models based on the feedback.

In embodiments, generating the inference outcome by processing the inference request using the target as input to the one or more machine learning models may include generating a plurality of candidate inference outcomes based on different processing of the target using the one or more machine learning models and using a selection strategy to select one of the candidate inference outcomes as the inference outcome. The selection strategy may be a maximum likelihood estimation, wherein the cognitive processes system uses the maximum likelihood estimation to select the inference outcome based on the inference outcome having a highest score amongst the plurality of candidate inference outcomes. The selection strategy may be a multi-arm bandit approach, wherein the cognitive processes system uses the multi-arm bandit approach to select the inference outcome based on a distribution of values of each of the candidate inference outcomes after a number of inference iterations are completed.

In embodiments, the inference request is included in an application programming interface (API) call, wherein the API call includes a request identifier for the inference request, the model identifier, and the target. The API call is a first API call, wherein the feedback is included in a second API call, wherein the second API call includes the request identifier and an outcome indicating the accuracy of the inference outcome with respect to the task. In embodiments, training the one or more machine learning models based on the feedback may include identifying a version of the one or more machine learning models used to generate the inference outcome based on the request identifier and training the identified version of the one or more machine learning models using the outcome.

In embodiments, the computer from which an inference request is received may be a computer used for a software product supported by the cognitive processes system. In embodiments, at least one of the one or more machine learning models is received from the software product. Further, the software product and the cognitive processes system may both be included in an application ecosystem.

In embodiments, the machine learning models are generated using the cognitive processes system.

In embodiments, the cognitive processes system includes an inference system and a training system, wherein the inference system receives the inference request and generates the inference outcome, wherein the training system receives the feedback and trains the one or more machine learning models.

In embodiments, a machine learning-as-a-service (MLAAS) system may include several elements for performing feature set enhancement, inference generation and machine learning. A first element of the MLAAS system may include a data store that stores machine learning models. A second element may include an enhancement system that enhances an inference request received from a computer, the inference request including a model identifier and a target defining a set of features for use in processing the inference request, the enhancement system configured to determine, based on the model identifier, one or more data sources of features from which the enhancement system retrieves one or more additional features based at least in part on the target, wherein the set of features corresponds to a task for evaluation using one or more machine learning models in the data store. A third element may include an inference system generating an inference outcome by processing the inference request using the target and the one or more additional features as input to one or more machine learning models that are retrieved from the data store using the model identifier and transmitting the inference outcome to the computer. Yet a fourth element may include a machine learning model training system training the retrieved one or more machine learning models based on feedback resulting from the transmitting, the feedback comprising one of an accuracy of the inference outcome with respect to the task that is received by the cognitive processes system and a default feedback based on the task.

In embodiments, the data store is a model data store, and the MLAAS system also includes a training data data store. This data store for training data that stores a training data set used by the cognitive processes system to train the one or more machine learning models, wherein a training data set corresponding to the inference request includes the feedback. In embodiments, the training data set further includes an indication of a version of the one or more machine learning models used to generate the inference outcome. Training the one or more machine learning models based on the feedback may include training the version of the one or more machine learning models based on the feedback.

In embodiments, generating the inference outcome by processing the inference request using the target as input to the one or more machine learning models may include generating a plurality of candidate inference outcomes based on different processing of the target using the one or more machine learning models and using a selection strategy to select one of the candidate inference outcomes as the inference outcome. The selection strategy may be a maximum likelihood estimation, wherein the cognitive processes system uses the maximum likelihood estimation to select the inference outcome based on the inference outcome having a highest score amongst the plurality of candidate inference outcomes. The selection strategy may be a multi-arm bandit approach, wherein the cognitive processes system uses the multi-arm bandit approach to select the inference outcome based on a distribution of values of each of the candidate inference outcomes after a number of inference iterations are completed.

In embodiments, the inference request is included in an application programming interface (API) call, wherein the API call includes a request identifier for the inference request, the model identifier, and the target. The API call is a first API call, wherein the feedback is included in a second API call, wherein the second API call includes the request identifier and an outcome indicating the accuracy of the inference outcome with respect to the task. In embodiments, training the one or more machine learning models based on the feedback may include identifying a version of the one or more machine learning models used to generate the inference outcome based on the request identifier and training the identified version of the one or more machine learning models using the outcome.

In embodiments, the computer from which an inference request is received may be a computer used for a software product supported by the cognitive processes system. In embodiments, at least one of the one or more machine learning models is received from the software product. Further, the software product and the cognitive processes system may both be included in an application ecosystem.

In embodiments, the machine learning models are generated using the cognitive processes system.

In embodiments, a method of automated machine learning model training may include a plurality of the following steps: receiving, at a machine learning-as-a-service (MLAAS) system, a machine learning model generated without using training data; receiving, by the MLAAS system, an inference request from a client, the inference request including data representing one or both of a request identifier and a target defining a set of features for use in processing the inference request; retrieving by the MLAAS system one or more additional features for processing the inference request, wherein the one or more additional features are related to at least one of the features in the set of features and are retrieved from one or more additional feature data sources; determining, by the MLAAS system, an inference outcome by processing the target and the one or more additional features using the machine learning model; transmitting, from the MLAAS system, a response to the inference request to the client, the response to the inference request indicating the inference outcome; after the response is transmitted to the client, receiving, at the MLAAS system, feedback from the client, the feedback including one or both of the request identifier or a task outcome indicating an accuracy of the inference outcome with respect to a task associated with the inference request; generating, by the MLAAS system, a training data set based on the inference request and the feedback; and training, by the MLAAS system, the machine learning model using the training data set.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 13 is a flowchart showing examples of methods for use of an MLAAS system to facilitate A/B testing in accordance with the present disclosure.

DETAILED DESCRIPTION

Figure 1:
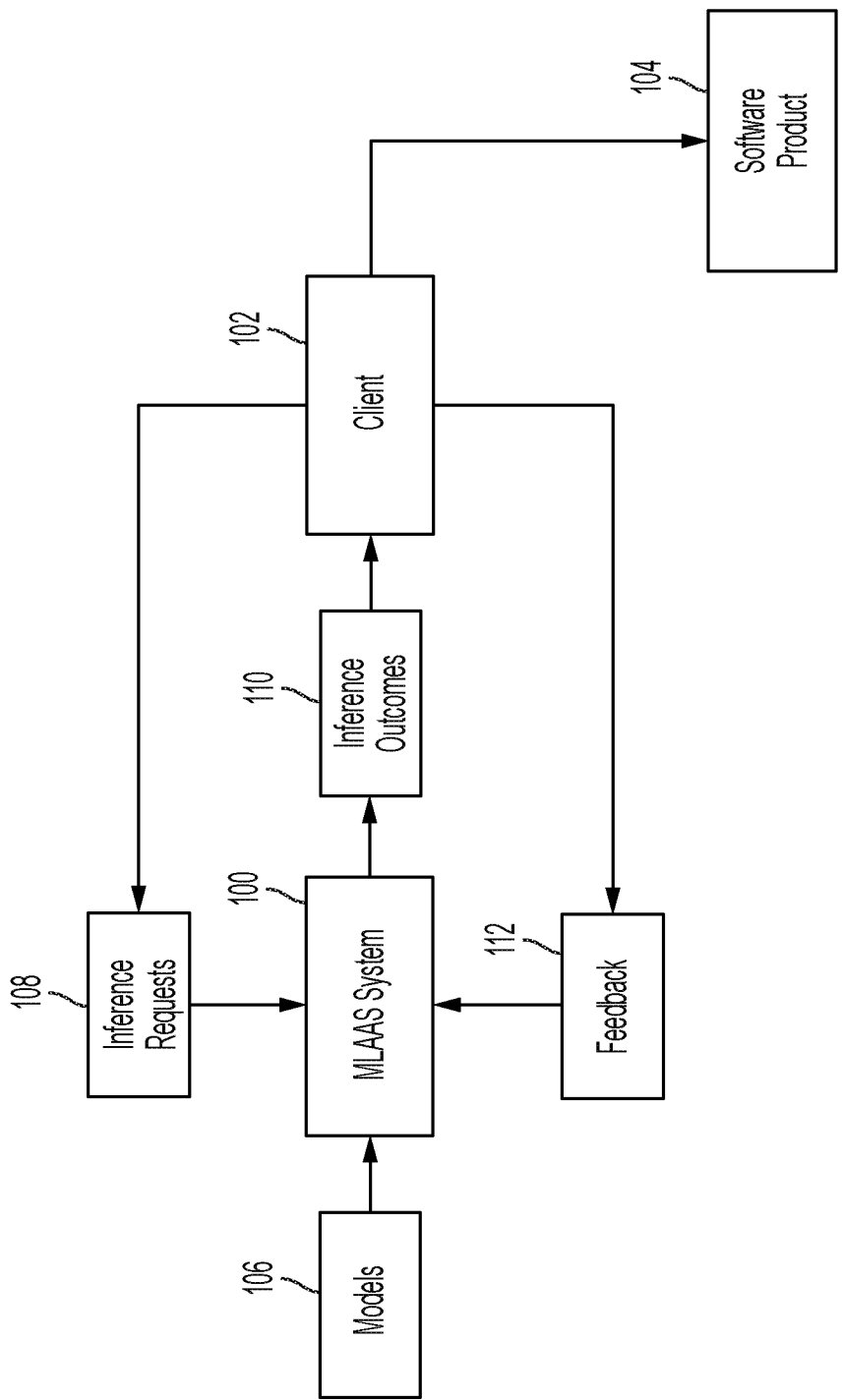
FIG. 1 is a block diagram showing examples of an MLAAS system used with a client for integrating machine learning into a software product in accordance with the present disclosure.

Decision making, which is typically a manual process performed based on a knowledge of a particular problem to solve, is core to every business and industry. A decision made based on precise analysis of the relevant factors may result in a successful sales pitch, marketing campaign, or product offering. On the other hand, poor decision making, even for relatively immaterial matters, may cause a business to suffer losses. For example, many business persons face daily problems that need to be solved using decision making. However, a person may resort to simply guessing where he or she is unable to arrive at an appropriate decision. For example, a marketer may need to compose an email to market a product or service. The marketer will need to consider factors such as the email contents, the recipients, the timing at which the email should be sent, and the like. Ultimately, if the marketer chooses to include the wrong content, addresses the email to the wrong recipients, or sends the email at the wrong time, the marketing exercise will have failed to meet its potential success.

In some cases, machine learning can be used to assist a decision maker in arriving at an effective decision. Conventional machine learning approaches have a user design a complicated learning system, called a machine learning model, and then select relevant data sets to be fed into that machine learning model for processing. After the machine learning model is carefully tuned according to the inputted data, it learns how to predict certain types of information. The model may then be deployed to assist a user in his or her decision making, such as by performing inference against further data sets provided by the user.

However, such conventional machine learning approaches suffer from several drawbacks. First, given the complexity of the machine learning field, these approaches require significant knowledge and skill to properly design and use. That is, typical machine learning systems today are designed and used by skilled machine learning engineers. As such, it is infeasible that the average business person would have access to a machine learning system to assist in his or her decision making.

Second, the training of a machine learning model requires careful attention to the training data and the particular version of the model to train. That is, numerous versions of a machine learning model and/or a data set may exist in a given machine learning system. As such, inference and training may be performed using outdated information. When accessing data from another system, a machine learning engineer typically accesses a current version of the data, but not necessarily the version of the data available at the time a particular inference request was processed. Even to the extent historical information is available and accurate, the process of manually identifying the versions used for processing a particular inference request can be highly error prone. Errors made by selecting an incorrect version of a machine learning model and/or an incorrect version of a data set may ultimately have a negative effect on a production deployment of the machine learning system.

Implementations of this disclosure address problems such as these using a modular MLAAS system, which uses machine learning to respond to tasks without requiring machine learning modeling or design knowledge by its users, and which uses data resulting from inferences to train a machine learning model. The MLAAS system receives an inference request including a model identifier and a target defining features for use in processing the inference request. The features correspond to a task for evaluation using a machine learning model associated with the model identifier. An inference outcome is generated by processing the inference request using the target as input to the model. Feedback indicating an accuracy of the inference outcome with respect to the task is later received and used to generate a training data set, which the MLAAS can use to further train the model used to generate the inference outcome. As a result, the training of a machine learning model by the MLAAS system is limited to using data resulting from an inference performed using that model.

The MLAAS system includes a cognitive processes system for training and performing inference against machine learning models. The machine learning models processed and trained using the cognitive processes system can be rapidly developed and deployed. The MLAAS system stores versions of machine learning models and data sets at the time of inference. The MLAAS system is able to automatically identify correct versions to use for inference and/or for training, thereby reducing or preventing errors that would otherwise arise from the manual identification of those versions. Data can be provided such as to suggest features of interest that may be relevant as inputs to a model. Feedback outcomes can be obtained such as to train a model.

The MLAAS system disclosed herein can receive a task from a user and process the task using machine learning to determine a useful response. For example, a marketer can send a task to the MLAAS system to give a recommendation on the best time to send an email to certain demographics of potential customers (e.g., based on customer age). The output of the MLAAS system is a response to that task based on processing of various data using a trained machine learning model. The MLAAS system is designed to be used by persons without particular knowledge of or skill in machine learning engineering or design. Rather, the MLAAS system disclosed herein uses an elegant, beneficial, and powerful interface to allow users to obtain effective, and oftentimes highly optimal responses to questions and other tasks.

To describe some embodiments in greater detail, reference is first made to examples of hardware and software structures used to implement an MLAAS system. FIG. 1 is a block diagram showing examples of an MLAAS system 100 used with a client 102 for integrating machine learning into a software product 104. The MLAAS system 100 is a modular machine learning system including one or more computing devices (e.g., servers) configured to serve machine learning tasks to one or more clients, such as the client 102. The machine learning tasks served by the MLAAS system 100 can be integrated or otherwise used within one or more software products of the client 102, for example, the software product 104.

The MLAAS system 100 can perform various tasks related to machine learning. In embodiments, the MLAAS system 100 can receive machine learning models 106, process inference requests 108 received from the client 102 using the models 106, and generate inference outcomes 110 as a result of processing an inference request 108. In other examples, the MLAAS system 100 can collect feedback 112 from the client 102 and reinforce the models based on the feedback 112. In yet another example, the MLAAS system 100 can collect data on behalf of the client 102, such as from one or more data sources, and/or enhance the targeted features described in an inference request 108.

The client 102 is an application or a device that is serviced by another device or application. For example, the client 102 may be a computing device of a computer service provider who produces, operates, or otherwise controls end user access to and use of the software product 104. Particularly, the client 102 may refer to an application or a device that accesses the services of another application or device, including an application or device associated with one or more servers. For example, a server on which the MLAAS system 100 is implemented may serve client applications executed by the client 102 directly and/or may serve a backend server that supports those client applications.

The software product 104 is a set of one or more computer programs that collectively perform one or more tasks. The software product 104 may, for example, include one or more web applications, native applications, and/or backend server applications. The execution of the computer programs of the software product 104 may be distributed across multiple devices and/or systems. For example, the software product 104 may include one component that can be executed or rendered at a user device (e.g., a client) and another component that can be executed at a backend server.

The software product 104 may be one offering in a larger suite of offerings. For example, a customer relationship management system may include a first software product that, on behalf of its users, creates content that is consumable by humans and optimized for search engines, a second software product that allows users to build multi-channel advertisement (ad) campaigns and that tracks the success of each campaign, a third product that sends targeted ads to users and that tracks conversions of each respective ad, a fourth product that provides a mechanism for users to identify leads (e.g., potential sales) and that executes workflows associated with those leads, and so forth.

The models 106 are machine learning models trained at least in part using a computer. Examples of the models 106 may include, but are not limited to, feedforward neural networks, deep neural networks, recurrent neural networks, modular neural networks, other neural networks, statistical models (e.g., linear models and decision trees), probabilistic models (e.g., Gaussian models and Bayesian models), cluster-based machine models, and the like.

The models 106 are received by the MLAAS system 100, for example, from the client 102 or a computing device of a machine learning modeler. When first received by the MLAAS system 100, the models 106 may be untrained. For example, the models 106 may be configured according to the relative expected importance of weights for certain types of data of the software product 104. The MLAAS system 100 can process the models 106, such as to perform inference using the models 106 and to train the models 106.

The inference requests 108 are domain-specific requests for inferences based on a target. A target defines a set of features of the software product 104. Thus, a target may refer to a collection of one or more data items related to a task for which an inference is requested. An inference request 108 includes a target and a model identifier. The model identifier indicates one or more of the models 106 into which the features defined by the target will be fed during the inference. An inference request 108 may also include a request identifier, which indicates information for uniquely identifying the inference request 108. An inference request 108 may also include a request identifier to uniquely identifying the inference request 108, such as for later use in training the model 106 associated with the model identifier.

The inference outcomes 110 are results of inference performed based on the inference requests 108. An inference outcome 110 represents the output of a model 106 after a data set (e.g., a target) is fed into it. The inference outcome 110 may thus refer to a record representing a prediction, classification, recommendation, and/or other machine learning-based determinations resulting from performing inference for an inference request 108. In some cases, a number of candidate inference outcomes 110 can be generated based on different outputs of one or more models 106 used to process the inference request 108. In such a case, one of the candidate inference outcomes 110 can be selected as the inference outcome 110 representing the final output of the inference process. The selected inference outcome 110 can then be transmitted to the client 102.

After an inference outcome 110 is transmitted to the client 102, the feedback 112 is received from the client 102. The feedback 112 includes an outcome indicating an accuracy of the inference outcome 110 with respect to a task associated with the corresponding inference request 108. The accuracy of the inference outcome 110 as represented by the feedback 112 may refer to a statistical accuracy based on a number of cases in which the inference outcome 110 was accurate. Alternatively, the accuracy of the inference outcome 110 as represented by the feedback 112 may refer to an efficacy of the inference outcome 110 is predicting actual results of the task associated with the inference request 108. The feedback may also include a request identifier for associating the outcome with that inference request 108.

To use the MLAAS system 100, a user associated with the software product 104 (e.g., a user of a device of the client 102) determines a task to be supported. The task may include one or more questions to be answered using machine learning (e.g., "what is the best time at which to send an email to a recipient to ensure at least a thirty percent chance of the recipient opening the email?"), a request for a statistical or other analysis (e.g., "determine the likelihood that a contact will become a customer in ninety days"), or another item for processing.

The user or another user (e.g., a machine learning engineer) creates and deploys an initial machine learning model 106, which is received by the MLAAS system 100. The initial machine learning model 106 is configured to perform inference against a data set to complete the task to be supported. For example, the initial machine learning model 106 may be a randomly generated model in which different weights of the model are randomly assigned to learning functions. In other examples, the initial machine learning model 106 may be generated according to a default distribution in which the same weights of the model are assigned to some or all of the learning functions. Other methodologies and techniques for generating the initial machine learning model 106 are possible.

After the initial machine learning model 106 is received at the MLAAS system 100, the MLAAS system 100 performs an initial inference using the initial machine learning model 106, for example, using an initial target received from the client 102 (e.g., as part of an initial inference request 108) or using an initial target already present at the MLAAS system 100. For example, where the task underlying the initial inference asks what the best time at which to send an email to a recipient to ensure at least a thirty percent chance of the recipient opening the email is, the initial target can include a data set from the software product 104 which can be used to answer that question. For example, the initial target may include the email, the subject line of the email, and the intended recipient.

In response to performing the initial inference, the MLAAS system 100 generates an inference outcome 110 for the initial inference. The inference outcome 110 is then transmitted to the client 102. After transmitting the inference outcome 110 to the client 102, the MLAAS system 100 receives feedback 112 to the inference outcome 110. The feedback 112 includes an outcome indicating how accurate the inference outcome 110 was in processing the task underlying the initial inference. For example, the outcome included in the feedback 112 can indicate the actual percentage of emails that were opened by the intended recipients during the "best time" indicated in the inference outcome 110.

The feedback 112 may be received from the client 102, for example, by the MLAAS system 100 sending a request for the feedback 112 to the client 102, by the MLAAS system 100 pulling the feedback 112 from the client 102 without a request, or by the client 102 sending the feedback 112 in response to a request from the MLAAS system 100 or without first receiving a request for the feedback 112 from the MLAAS system 100.

The MLAAS system 100 then trains the initial machine learning model 106 according to the feedback 112. For example, where the feedback 112 indicates that the inference outcome 110 was accurate (e.g., based on a threshold comparison), training the initial machine learning model 106 can include reinforcing the distribution of weights within the initial machine learning model 106. However, where the feedback 112 indicates that the inference outcome 110 was not accurate, training the initial machine learning model 106 can include redistributing the weights of the initial machine learning model 106.

Training the initial machine learning model can include updating the initial machine learning model 106. Alternatively, training the initial machine learning model 106 can include producing a new machine learning model based on the initial machine learning model 106 and the feedback 112. Regardless of the particular form of the new version of the model 106 resulting from the training, that new version of the model 106 may then be used for processing one or more subsequent inference requests 108. After each given inference request 108 is processed, the respective version of the model 106 can be retrained according to the corresponding feedback 112 received from the client 102.

Thus, the MLAAS system 100 iteratively trains a model 106 based on the particular version of the model 106 that was used to process an inference request 108 and based on the accuracy of the inference outcome 110 generated in response to the inference request 108, as represented in the feedback 112 received from the client 102. Further, where the feedback 112 is received without manual user intervention on the part of the client 102, the training of a model 106 may be automated by the MLAAS system 100.

Embodiments of the MLAAS system 100, the client 102, and/or the software product 104 may differ from what is shown and described with respect to FIG. 1. In some embodiments, the initial machine learning model may be created by or at the MLAAS system 100. For example, the MLAAS system 100 can use a set of inputs to create the initial machine learning model and then iteratively train that model. In such an embodiment, the MLAAS system 100 may be automated to create and update some or all of the models 106 without manual user intervention.

In some embodiments, the MLAAS system 100 can train the initial machine learning model according to the inference outcome 110 resulting from the initial inference. For example, the MLAAS system 100 can train the initial machine learning model according to the inference outcome in addition to training the initial machine learning model according to the feedback 112. In other examples, the MLAAS system 100 can train the initial machine learning model according to the inference outcome instead of training the initial machine learning model according to the feedback 112.

In some embodiments, the MLAAS system 100 may communicate directly with the software product 104. For example, the software product 104 may be part of an application ecosystem which transmits information to and receives information from the MLAAS system 100. For example, the software product 104 can transmit an inference request 108 to the MLAAS system 100 through an application programming interface (API) call including a model identifier, a request identifier, and a target. The software product 104 can later transmit the feedback 112 to the MLAAS system 100 through another API call including an outcome and the request identifier. The API calls may correspond to an API framework of the MLAAS, an API framework of the software product 104, or both.

In some embodiments, an inference request 108 may include a version identifier indicating a version of a model 106 to use to process the inference request 108. For example, where the model identifier included in the inference request 108 corresponds to the model 106, but not to the particular version of the model 106 to use to process the inference request, the version identifier can be used to uniquely identify the correct version of the model 106. In some such embodiments, the version identifier can be associated with the request identifier, such as to allow the MLAAS system 100 to identify the correct version of the model 106 to train upon receipt of the feedback 112.

In some embodiments, the models 106 have specific use definitions. For example, one or more of the models 106 can be created for use with a specific tenant of the MLAAS system 100, a specific user of the software product 104, a specific context or task presented to the MLAAS system 100 for evaluation, or the like.

Figure 2:
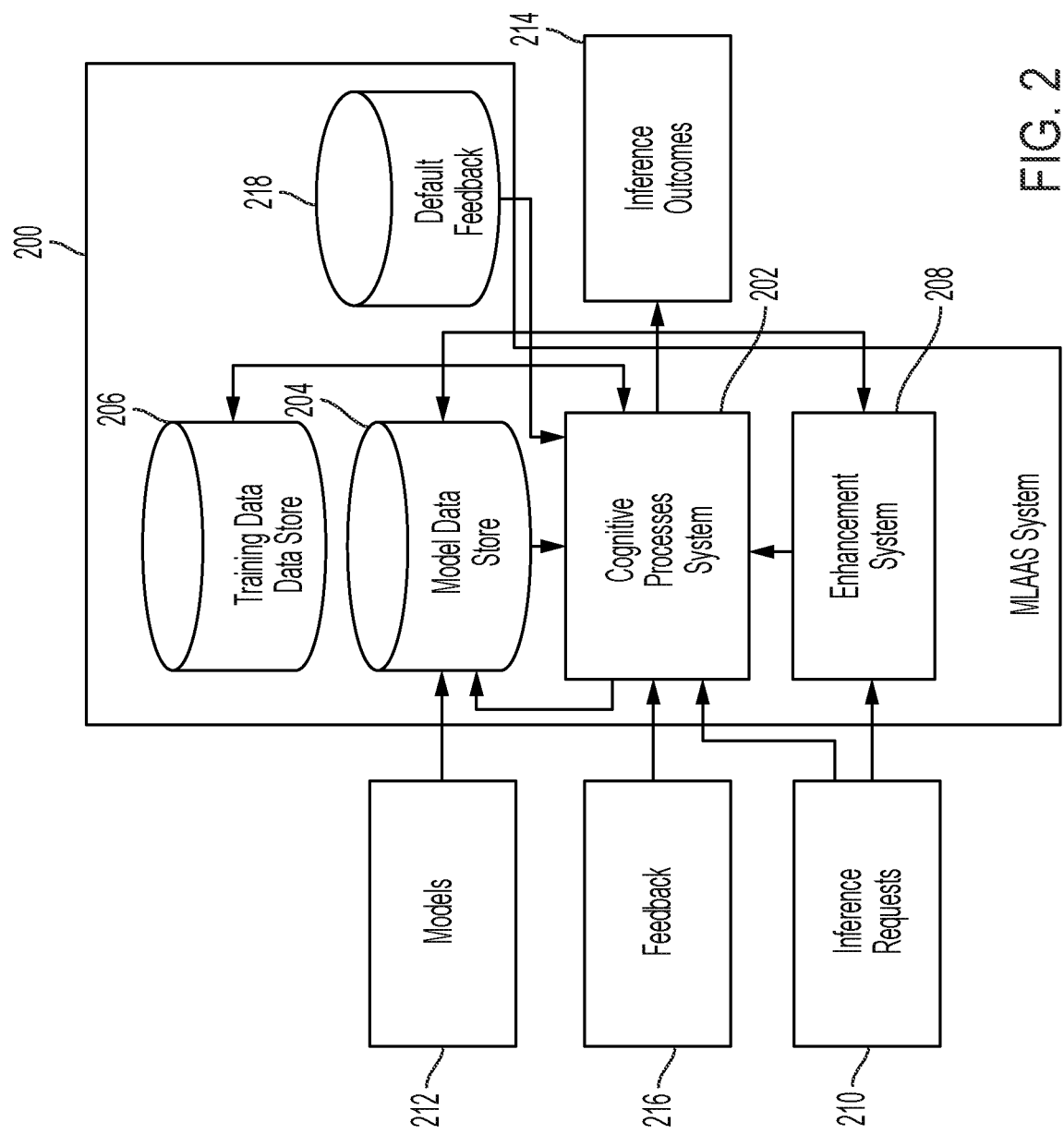
FIG. 2 is a block diagram showing examples of components of an MLAAS system and inputs and outputs of those components in accordance with the present disclosure.

FIG. 2 is a block diagram showing examples of components of an MLAAS system 200 and inputs and outputs of those components. The MLAAS system 200 may, for example, be the MLAAS system 100 shown in FIG. 1 or another MLAAS system. The MLAAS system 200 includes a cognitive processes system 202, a model data store 204, a training data data store 206, and an enhancement system 208.

The cognitive processes system 202 performs inference and training operations for the MLAAS system 200. In particular, the cognitive processes system 202 receives inference requests 210 (e.g., the inference requests 108 shown in FIG. 1) and models 212 (e.g., the models 106 shown in FIG. 1), such as from a client (e.g., the client 102 shown in FIG. 1) and/or another source. The cognitive processes system 202 processes the inference requests 210 to generate inference outcomes 214 (e.g., the inference outcomes 110 shown in FIG. 1), which may be transmitted to or otherwise made available to the client. The cognitive processes system 202 later receives feedback 216 (e.g., the feedback 112 shown in FIG. 1), such as from the client that made the corresponding inference request 210. The cognitive processes system 202 trains the models 212 according to the feedback 216.

The model data store 204 stores models 212. The model data store 204 may be a database (e.g., a relational database, an object database, a navigational database, an active database, a spatial database, or the like) or another data storage aspect (e.g., a file library, network cluster, or the like). The model data store 204 may include a version repository component in which different versions of the models 212 can be identified and retrieved, such as based on queries received from the cognitive processing system 202. The model data store 204 can store the models 212 themselves and/or data for identifying the models 212.

The model data store 204 may store the models 212 based on the one or more tasks with which the models 212 are associated. For example, there may be a number of different models used for the task of determining a likelihood that a contact will become a customer. Each of those models may be stored together or in relation to one another within the model data store 204. For example, each of the models 212 stored in the model data store 204 may be given a model identifier. In some cases, where two or more of the models 212 are used for the same task, those two or more models may be given the same model identifier. Alternatively, each of the models 212 may be given its own unique model identifier.

An inference request 210 may include a model identifier, a request identifier, and a target. When the cognitive processes system 202 receives the inference request 210, it can use the included model identifier to identify the corresponding model 212 within the model data store 204. For example, the cognitive processes system 202 can generate and transmit a query based on the model identifier included in the inference request 210 to the model data store 204. The information retrieved from the model data store 204 may then be used by the cognitive processes system 202 to process the inference request 210. The cognitive processes system 202 can later use the request identifier to relate information to the inference request 210, for example, for training the model 212 identified by the model identifier.

The training data data store 206 stores training data used by the cognitive processes system 202 to train the models 212. The training data data store 206 may be a database (e.g., a relational database, an object database, a navigational database, an active database, a spatial database, or the like) or another data storage aspect (e.g., a file library, network cluster, or the like). The training data data store 206 may include a version repository component in which different versions of the training data can be identified and retrieved, such as based on queries received from the cognitive processing system 202. For example, the versions of training data may correspond to a same model 212, but different feedback 216.

The cognitive processes system 202 can store the feedback 216 as training data within the training data data store 206. For example, the outcome from the client can be stored along with the request identifier associated with the inference request 210, which can lead to the feedback 216. An instance of training data may thus refer to the paired outcome and request identifier. To retrieve the instance of training data, the cognitive processes system 202 can query the training data data store 206 according to the request identifier.

The enhancement system 208 may, in some cases, receive the inference requests 210 before the cognitive processes system 202. In such a case, the enhancement system 208 processes an inference request 210 by enhancing some or all of the elements of the request, including the model identifier(s), the features defined by the target of the inference request 210, the task with which the target is associated, prioritization of the request for processing within the cognitive processes system 202, and the like. In embodiments, the enhancement system 208 may enhance the features by determining additional features to include in the target. In embodiments, the enhancement system 208 may enhance the model identifiers by adjusting at least one of the model identifier, the model version, model inputs, model outputs, model control parameters, and the like. In embodiments, the enhancement system 208 enhances the inference request by determining a degree of experience with the task associated with the request and based thereon determining a scope of feature enhancement. In embodiments, the enhancement system 208 enhances processing prioritization of the request so that, for example, the enhancement system and/or the cognitive processes system processes the request (e.g., to enhance the request and/or to generate one or more inferences) before processing other requests that may have been received ahead of the request.

The enhancement system 208 can determine the additional features by retrieving data related to the features of the target from one or more data sources, such as one or more data sources that are external to the MLAAS system 200. For example, the enhancement system 208 may query one or more of a proprietary data store, a third-party data store, or another data source for the additional features. The proprietary data store may be a data store used to store data for operating, running, and/or accessing the software product for which the MLAAS system 200 generates the inference outcomes 214. For example, the proprietary data store may be under the control of an entity that also controls the software product. The third-party data store may be a data store controlled by an entity that does not also control the software product or the MLAAS system 200. The other data sources may include examples not already described. In embodiments, the enhancement system 208 may determine the additional features by retrieving data related to the features in the request from one or more data sources internal to and/or controlled by the platform, such as one or more data sets including model inputs used by the cognitive processes system in producing one or more inference outcomes prior to receiving the present inference request. Examples may include input values that are not currently determined from the inference request but that were previously used in processing the model identified in the current request by the cognitive processes system 202, such as a prior instance of the current inference request, an instance of processing the model identifier for a different request, and the like. In embodiments, the enhancement system 208 may determine additional features by processing information produced by the cognitive processes system, such prior inference outcomes and the like using, for example, the model identified in the inference request, a later version of the model identified in the inference request and the like.

The enhancement system may select among a plurality of data sources from which it may retrieve information for enhancing the target. Selecting among the plurality of data sources may be based on aspects of the request, such as a model identifier(s), a target, a task associated with the target, a requestor of the inference, and the like. In embodiments, a first data set owned by the requestor and a second data set owned by a competitor of the requestor may be accessible to the enhancement system. In a first example, the enhancement system 208 may recognize that the second data set is for a competitor of the requestor based on metadata associated with the request, the first and second data sets, public competitor information, and the like. The enhancement system may pass over the competitor owned data set when selecting features for enhancing the target. Alternatively, the enhancement system may access the competitor's data set, but may obfuscate the source of the data or may process the competitor's data to make it more generic (i.e., genericize, reduce detail, obfuscate, anonymize, and the like) for use to enhance any request. In embodiments, a model identifier in an inference request may be used as a portion of an index for determining which data sources to use for target feature enhancement. In a model identifier-based data set selection example, a data set having to do with sports interests of users, some of whom may be identified in the request may be unrelated to the model identifier of the request. The determination of whether the sports interest data set is related to the model identifier may be based on metadata associated with the sports interest data set that fails to match use criteria of the model. The determination may be made by the enhancement system comparing data indicating the type of information in the data set (e.g., sports interest data types, such as sport, favorite team, and the like) with information indicating types of inputs that the model identified in the request can best use. If the model inputs are not of a sports interest type, then the sports interest dataset, despite having a strong correlation with user identifiers in the request would not be selected for harvesting enhanced features.

A benefit of an MLAAS system 200 is that it may have many third-party requestors that are unaffiliated, may come from a wide range of businesses, may have a wide range of tasks to be performed and the like. By tracking relevant information about each request, data set used, inference generated, and the like, an automated process may allow determining aspects of requests that facilitate determining candidate model identifiers, enhancement data sources, and the like automatically. Use of information (e.g., input features) included in unaffiliated requests for the same model identifier may be an additional form of enhancement. In examples, a first request may indicate a first set of features and a second request may indicate a second set of features that only partially overlaps with the first set of features. The requests may indicate the same model (and/or same version of the model). The two sets of features from the two unaffiliated requests may be aggregated as a form of enhancement for producing inferences for either or both requests; thereby providing additional candidate inferences that may be further processed, such as to through an inference selection process described elsewhere herein. In embodiments, the systems and methodologies disclosed herein can facilitate plugging into a variety of other sources and by integrating with a product area, the data from the variety of other sources can be deduplicated, which can, in turn, facilitate automatic connectivity with other data sources and the deduplication of that data, as needed.

The enhancement system 208 includes or otherwise accesses interface definitions for each of the data sources from which it retrieves the additional features. For example, an interface definition may include or otherwise refer to an identifier of the data source and an API of the data source or of a management system of the data source.

The data sources accessed using the enhancement system 208 may not directly relate to the task underlying the inference request. For example, where the inference request 210 asks whether a particular user of a software product is likely to purchase an upgraded license for the software product, the data sources accessed using the enhancement system 208 may include data sources related to the history of the user with the software product and related software products, but also data sources related to a profession of the user, an age of the user, and the like. In other examples, where the inference request 210 asks what the most effective time is to send an email to that particular user, the data sources accessed using the enhancement system 208 may include data sources indicating a time zone in which the user lives and past email viewing activity, but also data sources indicating the web history of the user. The examples disclosed herein detail additional methodologies, techniques and systems for selecting enhancement feature data sources, such as types of information that may be useful for processing a request. There may be a set of enhancement data source identification cross-references that allows the enhancement system to, for each word, phrase, image and the like expressed in the request (e.g., "user", "upgrade", "license", and the like) determine other related types of information that may be used to enhance the target. As an example, the word "user" describing a task in a request may be matched to such a cross-reference which may produce terms describing enhancement data such as "use history", "age", "profession" and the like. Similarly, "time" may be cross-referenced to "time zone", "time of email viewing activity", and the like.

Where the enhancement system 208 seeks access to a data source within an application ecosystem of the software product, the enhancement system 208 may not need to first obtain access permissions from the entity which controls the software product. Similarly, where the enhancement system 208 seeks access to a data source, which is not within an application ecosystem of the software product, the enhancement system 208 may need to first obtain such access permissions from the entity which controls that data source.

The enhancement system 208 can use the features included in the inference request 210 to determine the additional features. For example, where the target in the inference request indicates the feature of a user identifier, the enhancement system 208 can query one or more of the external data sources for information related to the user identifier, including, for example, the job title of the user and the education level of the user. In such a case, the external data sources may include a customer relationship management database. The enhancement system 208 can use add those additional features to the target to enhance the inference request 210.

The enhancement system 208 may also or instead determine the additional features based on the model identifier of the inference request 210. For example, a record of a model 212 stored in the model data store 204 may include a list of features associated with the model 212. For example, a model 212 created to determine content items to recommend to users of a given topic may include features of user identifiers, content identifiers, user preferences, content category types, and the like. This information may be used to further refine which data types and data sources to query for enhancement features.

The enhancement system 208 may also or instead use information included in the feedback 216 to determine the additional features to include in the target. For example, an outcome included in the feedback 216 for an inference request 210 may indicate that the inference outcome 214 was inaccurate (e.g., based on a threshold comparison). In such a case, the enhancement system 208 can be programmed and/or configured to include additional features to train the model 212, since for example, processing additional features with a model may be known to improve the accuracy of a subsequent inference outcome 214.

After the enhancement system 208 enhances the inference request 210, the enhanced inference request 210 is passed along to the cognitive processes system 202. The cognitive processes system 202 can then process the enhanced inference request 210 as disclosed herein to generate one or more of the inference outcomes 214. Using an enhanced inference request 210 may result in a more accurate inference outcome 214. For example, the additional features included in the target may more exactly identify the specific details which need to be processed using the applicable one or more models 212. That is, as a result of the enhancement, the models 212 can more accurately apply weights to various features to determine one or more of the inference outcomes 214 that more closely translates to a real-world outcome. The process of enhancement alone may reduce the need for training the one or more machine learning models 212 at least because each enhanced inference generated may reduce negative feedback regarding inference accuracy. The process of enhancement may also facilitate reduced bias being trained into a machine learning model by relying on a range of features, feature sources, and the like.

Embodiments of the MLAAS system 200 may differ from what is shown and described with respect to FIG. 2. In some embodiments, the enhancement system 208 may be omitted. In some embodiments, the model data store 204 and the training data data store 206 may be combined into one data store. For example, the model data store 204 and the training data data store 206 as shown and described with respect to FIG. 2 may represent sub-spaces in which information for training data and models are stored in a combined data store.

In some embodiments, the MLAAS system 200 may facilitate automated data collection for both generating inferences and for updating, training, or both, one or more models. In embodiments, the MLAAS system may implement a timeout policy. Such a timeout policy may facilitate capturing inaction as a form of feedback. For example, the timeout policy can specify an amount of time after one or more of the inference outcomes 214 are transmitted during which the feedback 216 based on that inference outcome 214 can be received. In the event the time period elapses, such as because no corresponding feedback 216 was received, the inference outcome may be discarded or otherwise ignored, and the model 212 used to produce the one or more inference outcomes 214 may not be updated or otherwise trained as a result of the inference performed based on the underlying inference request 210. In embodiments, when the feedback timeout expires, the model may be updated or otherwise trained with a default feedback value, such as a value that is selected from a default feedback data set 218. This may be beneficial for automating machine learning model training in the MLAAS system 200, when for example, a task for which the inference is generated and transmitted to the computer may not complete, such as when the task involves a human acting. One or more candidate reasons for the task not completing and/or the feedback not being returned may include, for example, in model control information may be provided or referenced in the inference request; may be learned based on feedback from prior uses of the model; may be undefined, thereby enabling the model to perform randomized learning; and the like. In examples, an inference generated and transmitted to a computer for evaluating a task may provide information regarding a likelihood that a user will reply to an email. The model or the machine learning system may assign a default value of feedback for this task, such as the user did not reply to the email. In embodiments, this default value may be captured in a default feedback data set 218. This default response may be used in association with the instance of use of the model that was processed to generate an inference to train the model as if the user did not reply to the email.

In some embodiments, the MLAAS system 200 may purge or ignore certain training data stored in the training data data store 206. For example, training data that is older than a threshold age may be purged automatically, such as to comply with one or more data retention policies that may be based on protecting privacy of an owner of the information, to comply with legal data retention guidelines, and the like. In other examples, training data that is older than a threshold age may remain in the training data data store 206, but not be further used for training the models 212. While this older than a threshold age data may not be used for training, by retaining it, further analysis on historical activities, such as model training related metrics and the like can be produced and/or analyzed.

In some embodiments, the cognitive processes system 202 performs batch processing of training data stored in the training data data store 206. For example, on a fixed time interval or otherwise, the cognitive processes system 202 may be configured to train the models 212 using training data stored within the training data data store 206 within a recent time threshold. For example, every other day, the cognitive process system 202 can perform updates based on training data that has been stored within the last forty-eight hours. Batch processing may provide benefits to an MLAAS system 200 including reducing costs, providing access to computing resources (e.g., for inference generation and the like) on a timely basis, optimizing use of computing resources for inference requests that share common elements, such as a common model and the like. Batching may also facilitate reduced impact on third-party data sets from which, for example, enhanced features may be retrieved by gathering features for several inference requests with fewer queries of the third-party data set.

Figure 3:
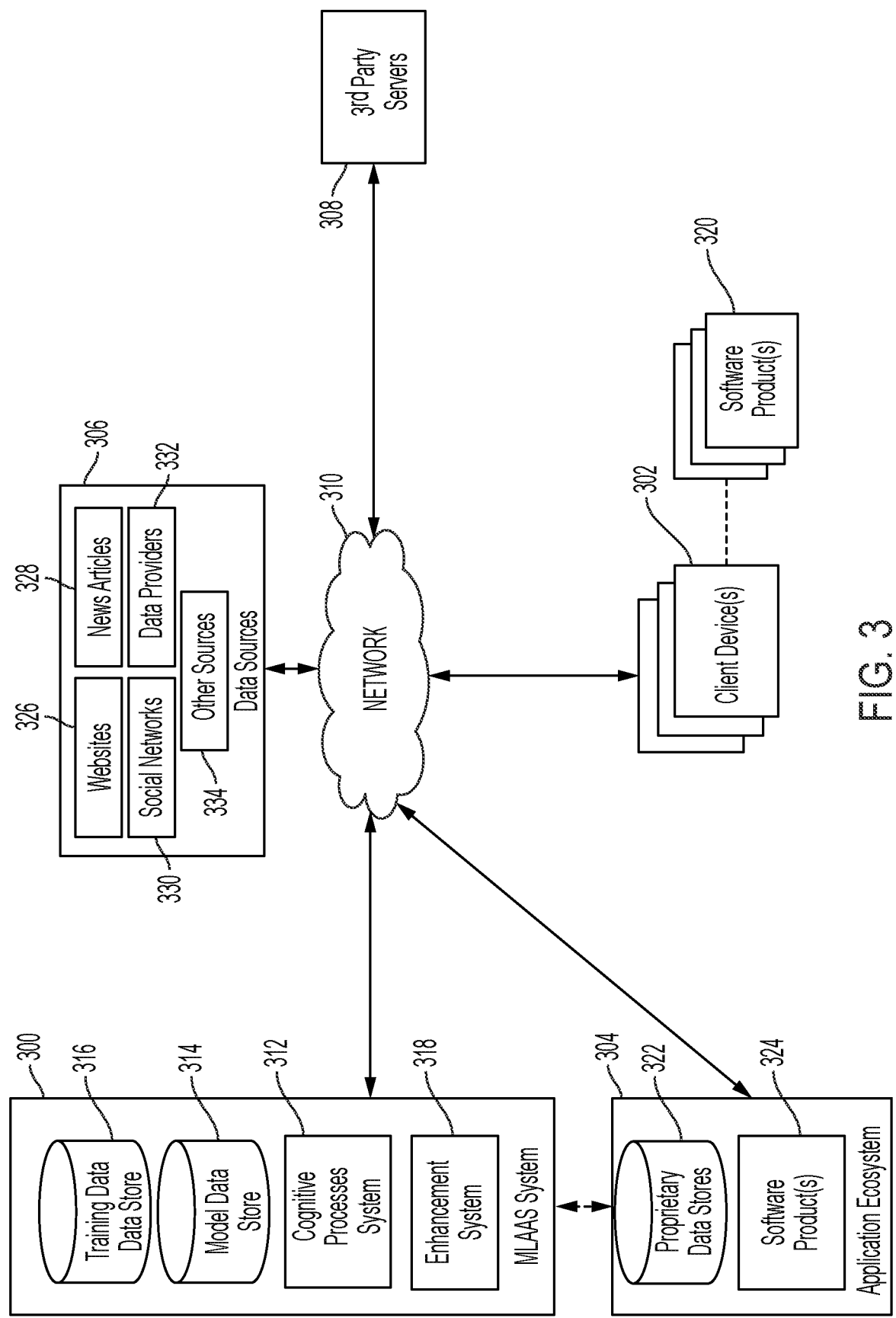
FIG. 3 is a block diagram showing examples of an MLAAS system implemented within a networked computer system in accordance with the present disclosure.

FIG. 3 is a block diagram showing examples of an MLAAS system 300 implemented within a networked computer system. The MLAAS system 300 may, for example, be the MLAAS system 200 shown in FIG. 2 or another MLAAS system. The networked computer system, as shown in FIG. 3, includes the MLAAS system 300, client devices 302, an application ecosystem 304, data sources 306, and third-party servers 308, which communicate over a network 310.

The MLAAS system 300 includes a cognitive processes system 312, a model data store 314, a training data data store 316, and an enhancement system 318, which may, for example, respectively be the cognitive processes system 202, the model data store 204, the training data data store 206, and the enhancement system 208 shown in FIG. 2.

The MLAAS system 300 receives an inference request (e.g., the inference requests 210 shown in FIG. 2) from a client device 302 and/or the application ecosystem 304 and processes the inference request to produce an inference outcome (e.g., the inference outcome 214 shown in FIG. 2) using one or more models stored in the model data store 314. The MLAAS system 300 may also receive feedback (e.g., the feedback 216 shown in FIG. 2) from the client device 302 and/or the application ecosystem 304 and use that feedback to train the one or more models used to process the corresponding inference request.

The client devices 302 include one or more client devices, such as the client device 102 shown in FIG. 1. Each of the client devices 302 may be associated with one or more software products 320, such as the software product 104 shown in FIG. 1. The client devices 302 are computing devices, which are not controlled by an entity that controls the MLAAS system 300. Each of the client devices 302 may be associated with one of the software products 320. Alternatively, some or all of the client devices 302 may be associated with one or more of the software products 320.

The application ecosystem 304 is an application ecosystem that is not controlled by an entity that controls the MLAAS system 300. For example, the application ecosystem 304 may include or otherwise refer to one or more proprietary data stores 322 and one or more software products 324. For example, the software products 324 may be a set of one or more programs that use the machine learning functionality of the MLAAS system 300. The proprietary data stores 322 may be databases or other data stores that store information used to operate, run, or otherwise access the software products 324.

The clients 302 and/or the application ecosystem 304 may utilize an API framework of the MLAAS system 300 to communicate with the MLAAS system 300. For example, an API call can be used to transmit inference requests to the MLAAS system 300, to request inference outcomes from the MLAAS system 300, to transmit feedback based on an inference outcome to the MLAAS system 300, and so forth. As such, the API calls are typically received by the cognitive processes system 312. In some cases, however, the API calls can be received by the enhancement system 318, such as where the enhancement system 318 enhances the features in a target before an inference request is processed.

The data sources 306 include or otherwise refer to data sources, which are external to the MLAAS system 300 and external to the application ecosystem 304. The data sources 306 may, for example, include websites 326, news articles 328, social networks 330, data providers 332 (e.g., databases maintained thereby), or other sources 334.

The data sources 306 may, in some cases, be used by the MLAAS system 300 to enhance the features in a target before an inference request received at the MLAAS system 300 is processed. For example, the enhancement system 318 can query one or more of the data sources to determine additional features to include in the target. The enhancement system 318 can then enhance the target by adding those additional features to it.

The third-party servers 308 include one or more computing devices that may provide some functionality of the software products 320 and/or the software products 324. Alternatively, the third-party servers 308 may include one or more computing devices that may be accessed to process an inference request at the MLAAS system 300.

The network 310 can be or include the Internet, a local area network, a wide area network, a virtual private network, a machine-to-machine network, or another public or private network for facilitating communications between the MLAAS system 300, client devices 302, an application ecosystem 304, data sources 306, and third-party servers 308. The network 310 can include or use networking devices to facilitate communications, for example, routers, switches, load balancers, or other networking devices.

Embodiments of the MLAAS system 300 may differ from what is shown and described herein, as depicted in FIG. 3. In some embodiments, the MLAAS system 300 may be locally implemented by or on a client device 302. In such an embodiment, the network 310 can be omitted. Alternatively, the network 310 may still be included, such as to facilitate communications between the client 302 and one or more of the application ecosystem 304, the data sources 306, or the third-party servers 308; however, in such an embodiment, communications between the client 302 and the MLAAS system 300 are facilitated without using the network 310.

In some embodiments, the third-party servers 308 may be omitted. In some implementations, the application ecosystem 304 may be omitted. In some embodiments, the client devices 302 and the software products 320 may be omitted. In some embodiments, the data sources 306 may be omitted. In some embodiments, a combination of the client devices 302 and the software products 320, the application ecosystem 304, the data sources 306, or the third-party servers 308 may be omitted.

In some embodiments, the enhancement system 318 may be configured by a user of a software product 320, a software product 324, or the MLAAS system 300 with settings for accessing the data sources 306. For example, a user can define access permissions for specific data sources 306 to be accessed using the enhancement system 318. In other examples, the user can configure the enhancement system 318 to prioritize particular data sources 306.

In some embodiments, the MLAAS system 300 may be implemented using one or more servers at a datacenter. The server or servers used to implement the MLAAS system 300 at the datacenter may refer to one or more physical server devices and/or one or more virtual servers. For example, the MLAAS system 300 may be implemented using an application server and a database server, which application server and database server can be implemented on a single server or across multiple servers.

The application server, which can be implemented using processing threads, virtual machine instantiations, or other computing features, executes instructions to deliver services of the MLAAS system 300 to a client device 302. The database server, which may include a storage unit for implementing one or more databases, is accessed by the application server in connection with the delivery of those services of the MLAAS system 300 to the client device 302. The application server and the database server may be used to instantiate a single tenant instance or a multi-tenant instance of software associated with the services of the MLAAS system 300.

Separate instances of the MLAAS system 300 may be instantiated for different client devices 302. For example, application servers and database servers used for the MLAAS system 300 can respectively be implemented using application nodes and database nodes. An application node instantiates a version of the software associated with the services of the MLAAS system 300 for access and use by a client device 302. A database node instantiates data of that software version for use by the application node.

Figure 4:
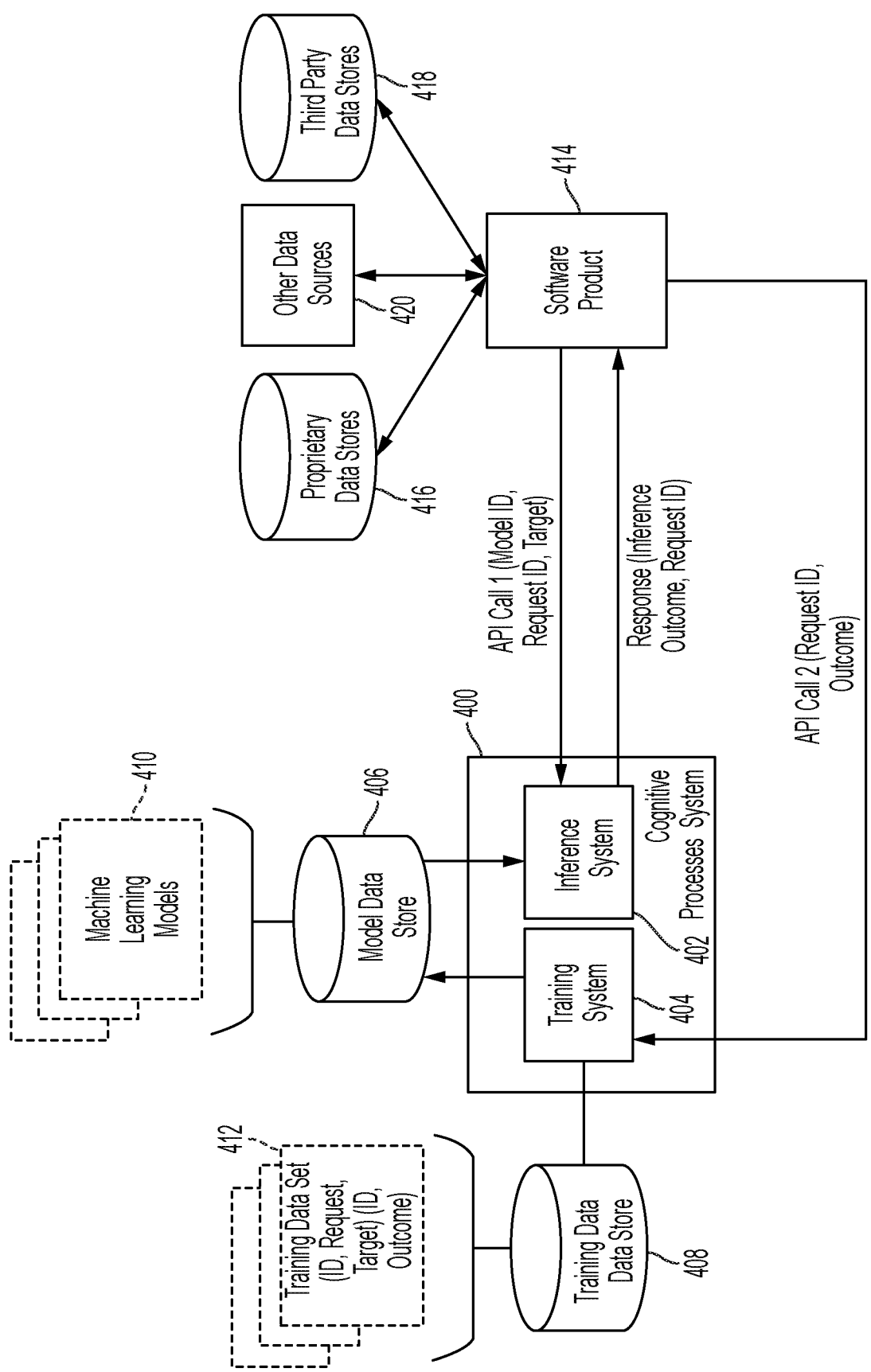
FIG. 4 is a block diagram showing example environments of an MLAAS system in accordance with the present disclosure.

FIG. 4 is a block diagram showing example environments of an MLAAS system. The environment includes a cognitive processes system 400, which may, for example, be the cognitive processes system 312 shown in FIG. 3. The cognitive processes system 400 includes an inference system 402 and a training system 404. The inference system 402 includes or otherwise refers to the inference functionality of the cognitive processes system 400. For example, the inference system 402 can receive inference requests, process the inference requests, and generate inference outcomes. The training system 404 includes or otherwise refers to the training functionality of the cognitive processes system 400. For example, the training system 404 can train models stored in a model data store 406 (e.g., the model data store 314 shown in FIG. 3), such as based on an output of the inference system 402 and/or based on feedback received after an inference outcome is transmitted from the inference system 402.

The environment also includes the model data store 406 and a training data data store 408 (e.g., the training data data store 316 shown in FIG. 3). The model data store 406 stores records of machine learning models 410 (e.g., the models 212 shown in FIG. 2). The training data data store 408 stores training data sets 412 used to train the machine learning models 410.

The cognitive processes system 400 performs inference and training operations on behalf of a software product 414. The software product 414 may be a software product that communicates indirectly with the cognitive processes system 400, such as through a client (e.g., the software product 320 and the client 302 shown in FIG. 3). Alternatively, the software product 414 may be a software product which communicates directly with the cognitive processes system 400, such as from within an application ecosystem (e.g., the software product 324 and the application ecosystem 304 shown in FIG. 3).

The software product 414 can use data from one or more of proprietary data stores 416, third-party data stores 418, and/or other data sources 420. For example, the proprietary data stores 416 may include or refer to data stores internal to an application ecosystem of the software product 414 (e.g., the proprietary data stores 322 of the application ecosystem 304). The third-party data stores 418 may include or refer to data stores accessible to or third-party servers (e.g., the third-party servers 308 shown in FIG. 3). The other data sources 420 may include or refer to data sources other than the proprietary data stores 416 and the third-party data stores 418 (e.g., one or more of the data sources 306 shown in FIG. 3).

The software product 414 makes API calls (e.g., using an API framework of the MLAAS system that includes the cognitive processes system 400) to initiate processing by the cognitive processes system 400. For example, the software product 414 can make a first API call to transmit an inference request to the inference system 402. The inference request of the first API call includes a model identifier, a request identifier, and a target. The inference system 402 can process the inference request of the first API call and then transmit a response to the first API call to the software product 414. The response to the first API call can include an inference response and the request identifier from the inference request.

The software product 414 can then make a second API call to transmit feedback to the training system 404. The feedback of the second API call includes the request identifier from the inference request of the first API call and an outcome corresponding to the inference outcome from the response to the first API call. The training system 404 can process the second API call to train or generate one or more training data sets 412 to use for training one or more of the machine learning models 410.

In processing an inference request (e.g., received in a first API call from the software product), the inference system 402 can perform pre-processing methodologies, techniques, and the like to identify the features defined by the target in the inference request, for example, feature extraction, entity recognition, or the like. In some cases, performing the pre-processing methodologies, techniques or other systems can include using a task underlying the inference request to determine a series of subtasks, which may be useful to process that task. For example, where the task asks for the best time to send an email to a particular recipient, the subtasks may relate to determining the likelihood that the particular recipient will view the email at certain times. For example, a first subtask may relate to determining that likelihood at a first time of the day, a second subtask may relate to determining that likelihood at a second time of the day, and so forth.

Once those features are identified, the inference system 402 can process the inference request by feeding those features into the model identified by the inference request. Performing inference using the identified model and the identified features can include the inference system 402 generating a number of inference outcomes as candidates for the inference request and then using a selection strategy to select one of those inference outcomes as the final output of the inference process.

For example, the selection strategy may be a maximum likelihood estimation. In such an example, each of the candidate inference outcomes can be given a score representing a confidence of that candidate inference outcome. The inference system 402 can use the maximum likelihood estimation to select an inference outcome based on the inference outcome having a highest score amongst the candidate inference outcomes.

In other examples, the selection strategy may be a multi-arm bandit approach. In such an example, the inference system 402 may select the candidate inference outcome with the greatest predicted outcome. The predicted outcome for a candidate inference outcome is determined as a function of the depth of the data used to generate that candidate inference outcome (e.g., how wide or narrow the value distribution is) and the likelihood that the candidate inference outcome is an accurate outcome for the task underlying the inference request that leads to it (e.g., how high the peak for the distribution is).

The multi-arm bandit approach explores the candidate inference outcomes which have lower peaks in the value distribution, such as to determine whether one of those may be capable of a highest overall peak for the distribution. The multi-arm bandit approach further exploits the highest overall peak for selection as the output inference outcome. For example, the multi-arm bandit approach may use an Epsilon-greedy policy, a Thomson policy, or another policy for exploring and exploiting the values in a candidate inference outcome distribution. Given that the multi-arm bandit approach is used to select an inference outcome, which will then be used to train the one or more models that generated the inference outcome, the multi-arm bandit approach may also be referred to as a contextual multi-arm bandit approach.

For example, an inference request in a first API call to the inference system 402 can refer to the task of determining a best time at which to send someone an email. The features in the target of the first API call may indicate different ages for the possible email recipients. The inference system 402 can use a multi-arm bandit approach to process the inference request. The multi-arm bandit approach may initially determine that a particular time is best for most people; however, certain peaks corresponding to specific age groups may merit further exploration. In such an event, the multi-arm bandit approach further iterates on those peaks to determine whether they may actually achieve a higher value than the initially determined best time.

Embodiments of the environment of an MLAAS system may differ from what is shown and described with respect to FIG. 4. In some embodiments, the software product 414 may receive a response to the second API call from the cognitive processes system 400. For example, the response to the second API call can indicate a result of a training performed based on the contents of the second API call and/or the successful creation of a training data set 412 based on those contents.

In some embodiments, the API calls may be received from a client (e.g., one of the client devices 302 shown in FIG. 3) rather than from the software product 414. For example, the client can make a first API call to transmit the inference request, receive the response to the first API call, and make a second API call to transmit the feedback. In some such embodiments, the client can also receive a response to the second API call from the cognitive processes system 400 and/or otherwise communicate with the cognitive processes system 400 on behalf of the software product 414.

Figure 5:
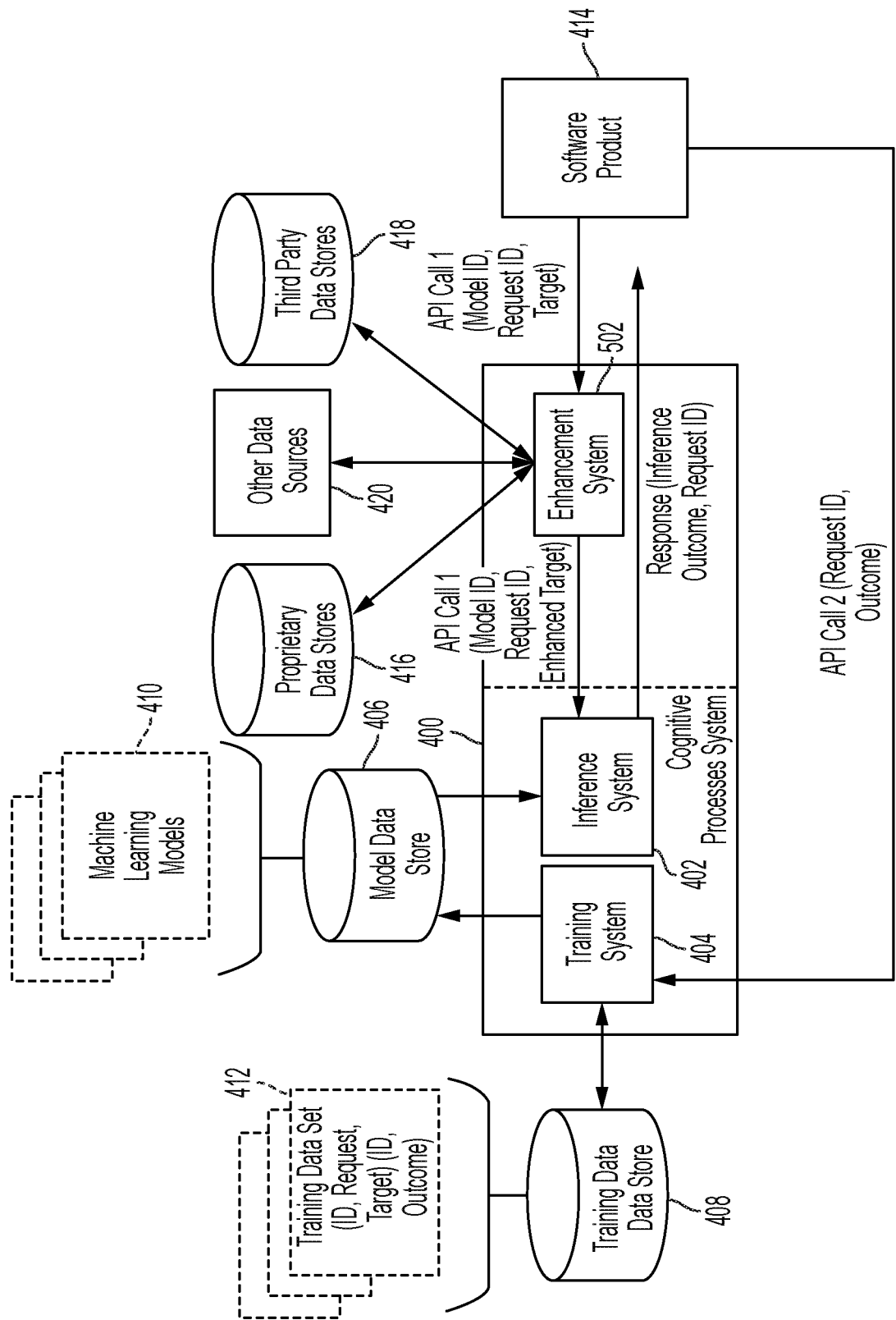
FIG. 5 is a block diagram showing example environments of FIG. 4 including feature enhancement functionality in accordance with the present disclosure.

FIG. 5 is a block diagram showing the example environments of FIG. 4 including feature enhancement functionality. In particular, an enhancement system 502, which may, for example, be the enhancement system 318 shown in FIG.

3 or another enhancement system, is introduced within the environment shown in FIG. 4. The enhancement system 502 adds the additional features to the target included in the inference request of the first API call to result in an enhanced target. The enhanced target is then passed along from the enhancement system 502 to the cognitive processes system 400, such as for processing by the inference system 402.

For example, the enhancement system 502 can receive the first API call including the target. The enhancement system 502 may then query the proprietary data stores 416, the third-party data stores 418, and/or the other data sources 420 for additional features to include in the target. After retrieving those additional features from the proprietary data stores 416, the third-party data stores 418, and/or the other data sources 420, the enhancement system 502 enhances the target by adding the additional features to the set of features initially defined in the first API call. The first API call including the enhanced target is then sent from the enhancement system 502 to the inference system 402 for processing.

Embodiments of the environment of an MLAAS system may differ from what is shown and described with respect to FIG. 5. In some embodiments, the first API call including the inference request may include one or more source identifiers for identifying one or more of the data sources to use to enhance the features of the target. For example, the enhancement system 502 can use the one or more source identifiers in the first API call to determine which of the proprietary data stores 416, the third-party data stores 418, and/or the other data sources 420 to query for the additional features. In such an embodiment, a user of the entity which controls the software product may select the proprietary data stores 416, the third-party data stores 418, and/or the other data sources 420 which may be used to enhance a given target.

Alternatively, in such an embodiment, the selection of the proprietary data stores 416, the third-party data stores 418, and/or the other data sources 420 which may be used to enhance a given target may be automated, for example, by the enhancement system 502. For example, the enhancement system 502 can determine which of the proprietary data stores 416, the third-party data stores 418, and/or the other data sources 420 to use based on other contents within the inference request (e.g., the model identifier, the target, and/or the request identifier). In other examples, the enhancement system 502 can determine which of the proprietary data stores 416, the third-party data stores 418, and/or the other data sources 420 to use based on recently processed inference requests, statistics indicating the most frequently accessed data sources, or other information which may be accessible to the enhancement system 502.

Figure 6:
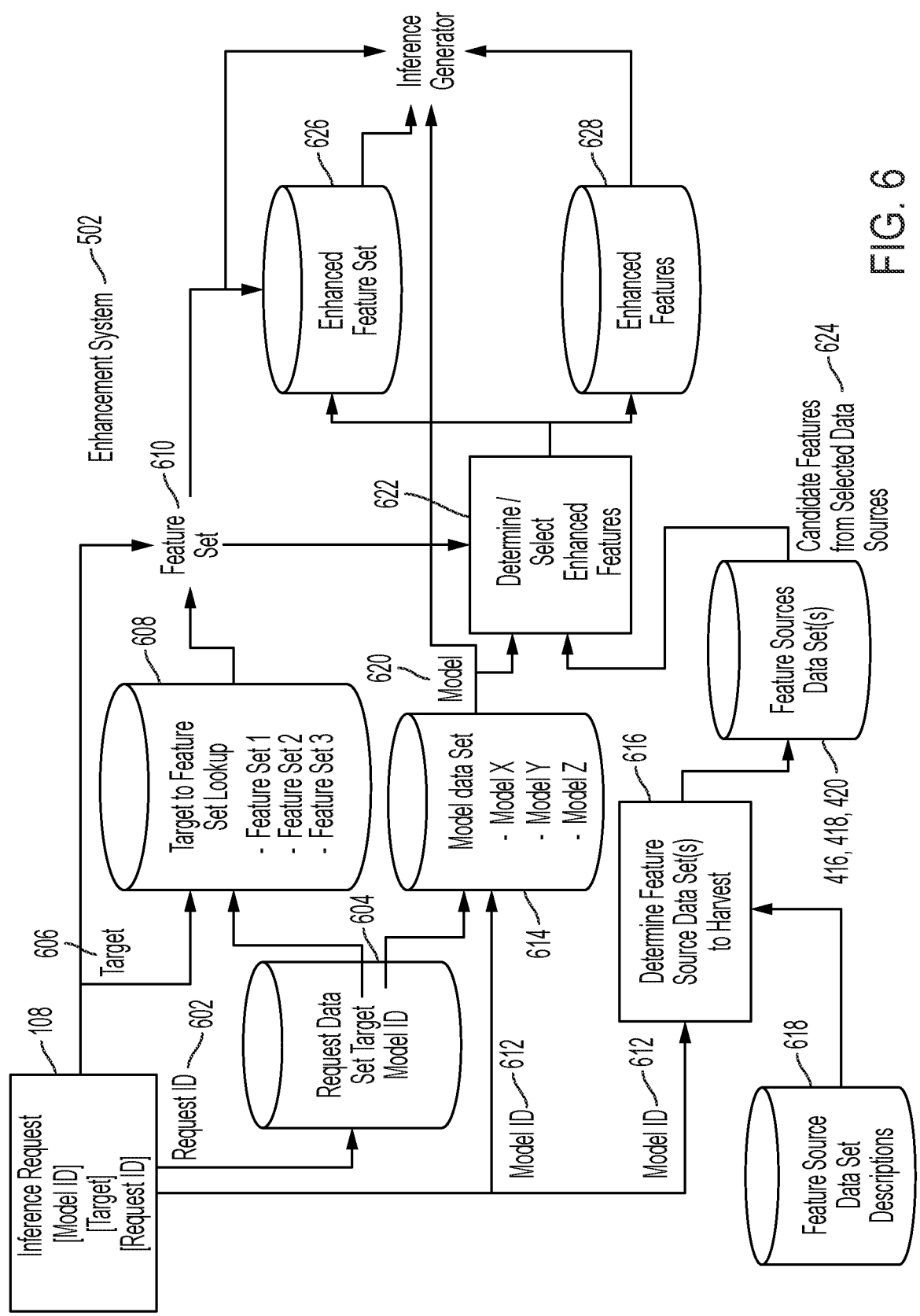
FIG. 6 is a block diagram showing example embodiments of enhancement functionality in accordance with the present disclosure.

FIG. 6 depicts exemplary embodiments of the enhancement system 502. The enhancement system 502 may process an inference request 108 by separately operating on various contents of the request 108, such as the model ID 612, the target 606 and the request ID 602. In embodiments, the request ID 602 may be processed with a request ID data set that may facilitate retrieving target and model ID information from the request ID alone. This may occur, such as when an earlier request was received by the enhancement system 502 and a request data set 604 was produced and/or updated. In embodiments, where the enhancement system 502 is part of an ecosystem with a computer, such as client device 302 and the cognitive processes system 400 and the like, request ID may be universally known and/or shared among the participating systems within the ecosystem. In embodiments, the request data set 604 may be configured by a requestor, by an MLAAS system 200 operator, by an automated request ID generation process and the like.

At least one of the target 606 and the target retrieved from the request data set 604 may be used to access a feature data set 608 that, for example, may provide access to features for each target 606 value, such as by associating a feature set "Feature Set 1" to a first target 606 value and associating feature set "Feature Set 2" to a second target 606 value; thereby producing a feature set 610 for use with the inference request 108. As depicted in FIG. 6, the feature set 610 may be received directly with the inference request 108, such as an array of values associated with the target 606 included in the inference request 108.

At least one of the model id 612 and a model ID produced from the request data set 604 may be used for determining which enhanced feature set to harvest and which of the available features in the feature set to select. In embodiments, model id 612 and/or model id from data set 604 may be processed by the enhancement system 502 to determine at least one model 620, such as by selecting a model from model data set 614 with an index based on one or more of the model id 612 and the model id of data set 604.

Selection of an enhancement feature data store may be performed automatically by function 616 based on, for example, other contents within the inference request (e.g., the model identifier, the target, and/or the request identifier). Also, the function 616 can determine which of the enhanced feature source data sets (e.g., proprietary data stores 416, the third-party data stores 418, and/or the other data sources 420) to use based on recently processed inference requests, statistics indicating the most frequently accessed data sources, or other information which may be accessible to the enhancement system 502, such as feature source data set descriptions 618. The selected enhanced feature data stores may represent a set of candidate features for enhancement 624.

Candidate enhancement features 624 may be processed with an enhanced feature selection module 622 that may apply methodologies, techniques, or the like for determining which features in the target to enhance. These methodologies, techniques, or the like may include determining a relative importance, for at least the indicated model, of the requested features. Information about a selected model 620 may be used to facilitate selecting among the candidate enhancement feature 624. Features (e.g., inputs to the model 620) that are heavily weighted in the indicated model 620 may be enhanced; whereas features that are not weighted or substantively lower in effective weight may not be enhanced. In embodiments, features in the feature set 610 may be selected to enhance based on term frequency importance methodologies, techniques, or the like that facilitate determining, for a given statement or set of terms/phrases, a relative ranking, (e.g., gross level quantized ranking and the like) of the features. In examples, a term that appears often in historical requests for a given model identifier (or at least a type of model identified in the request) may be more likely to be enhanced than a term that occurs sparsely in such requests. Other methodologies, techniques, or the like for feature importance may be used as well, such as terms that appear to be important for a given task, a given requester and the like (e.g., a term that is specific to an industry, such as a form of jargon for the industry) may be targeted for enhancement independent of the frequency of use and/or the weighting of the feature in the indicated model. In embodiments, methodologies, techniques, or the like include determining which features enhance may include basing enhancement for a target are features in the target that have been used often as a source for enhancement in prior enhancements (e.g., prior iterations, unaffiliated requests, and the like).

Additionally, the enhancement system 502 may recommend additional/alternate models for generating inferences based on aspects of the request, such as the model identifier, the target, the task, an identity of the requestor and the like. In examples of recommending models, a request may identify a first model; however, the enhancement system may determine that a newer and/or enhanced model (or version thereof) is available and recommended for producing inferences, such as if the indicated model has been deemed to be obsolete for generating new inferences. This example may have little to do with the particulars of the request other than perhaps the apparent age of the indicated model. However, the recommended replacement model may require features (inputs) for best processing that are not present in the request 108. Therefore, the enhancement system 502 may use other methodologies, techniques, or the like for enhancing target feature sets, such as those noted herein for ensuring that all or at least a minimum number of model inputs/input types that the model can process are included in the inference feature set. For completeness, the MLAAS system 200 may produce inferences for the indicated model (with and/or without an enhanced target set) and a determined alternate/enhanced model and present one or more of the produced inferences to the requestor and the like.

The enhancement system 502 may further produce an enhanced feature set 626 by, for example, combining the feature set 610 and the features selected by the enhancement feature selection module 622. Alternatively, the enhancement system 502 may produce an enhanced features set 628 that may be provided to the cognitive processes system 202 for inference generation, and the like.

Figure 7:
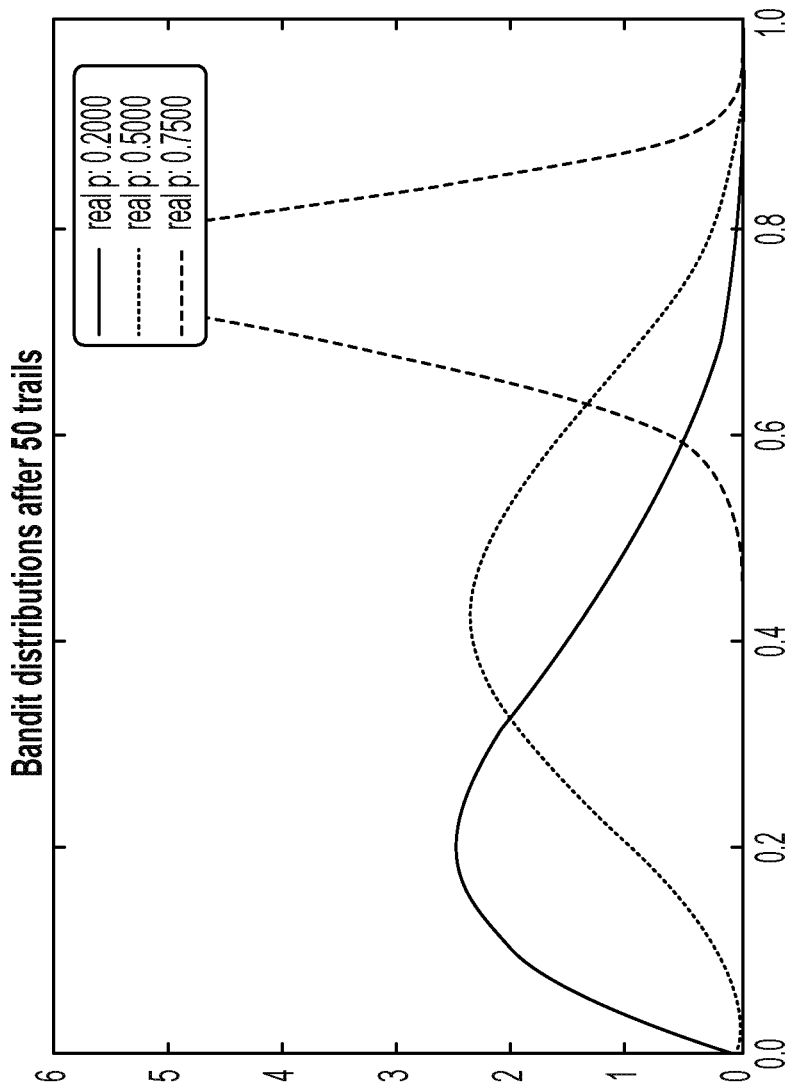
FIGS. 7 and 8 are illustrations showing exemplary data distributions for a selection strategy used by an MLAAS system to process inference requests in accordance with the present disclosure.

FIG. 7 is a first illustration showing data distributions for a selection strategy used by an MLAAS system to process inference requests. Specifically, the illustration of FIG. 7 shows the distributions of values from inferences performed using a multi-armed bandit approach as the selection strategy after 50 trial inferences. Three value peaks are shown in which a rightmost peak corresponding to the x-axis value of 0.8 is the highest peak in the distribution. The multi-arm bandit approach for selecting the inference outcome may explore the other two peaks, such as by iterating on those values using one or more machine learning models and evaluating the results of the iteration. After a number of further trials are completed, the multi-arm bandit approach may indicate to exploit the highest peak of the distribution, so as to select a candidate inference outcome corresponding to that highest peak.

Figure 8:
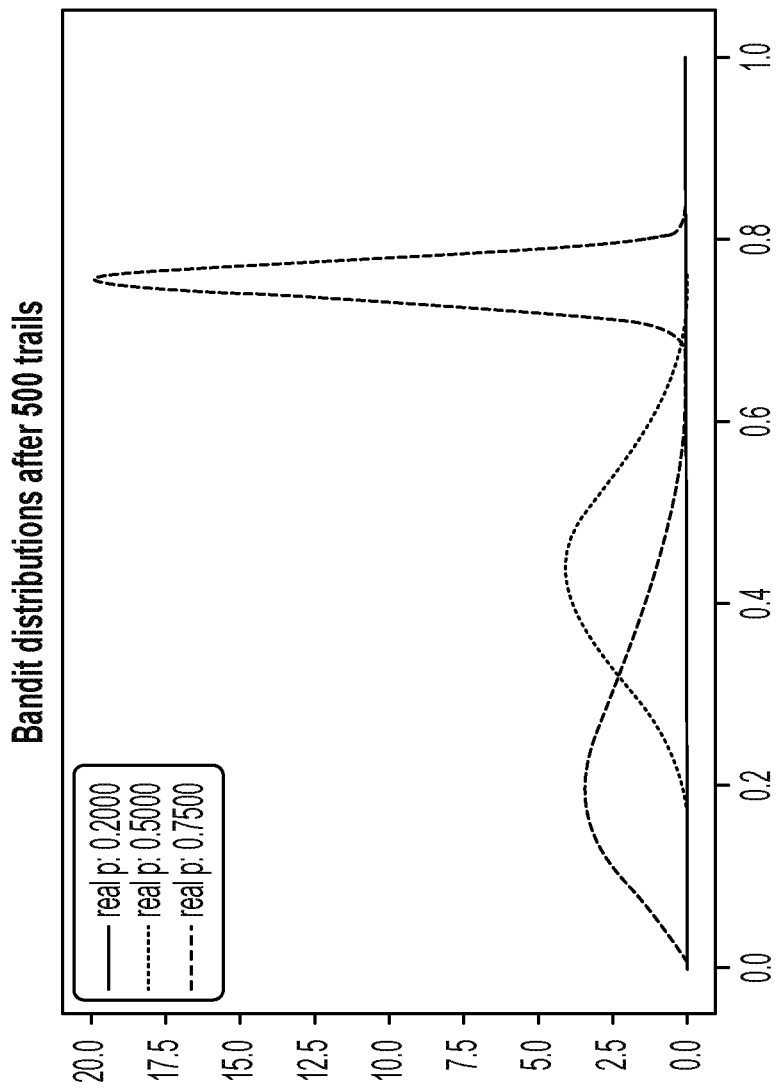

FIG. 8 is a second illustration showing data distributions for a selection strategy used by an MLAAS system to process inference requests. Specifically, the illustration of FIG. 8 shows the distributions of values from inferences performed using a multi-armed bandit approach as the selection strategy after 500 trial inferences. The change in the peak values of the distribution represent the changes in the distribution after 450 further trials were iteratively conducted after the distribution of FIG. 7. As compared to the distribution of FIG. 7, the values for the two leftmost peaks have lowered in comparison to the rightmost peak, which remains the highest peak in the distribution. As such, the candidate inference outcome associated with that rightmost peak may be selected as the inference outcome to indicate to a software product and/or to a client in response to an inference request. This is because that candidate inference outcome has been predicted, based on the iterative trials, to result in the most accurate results amongst the candidate inference outcomes.

Figure 9:
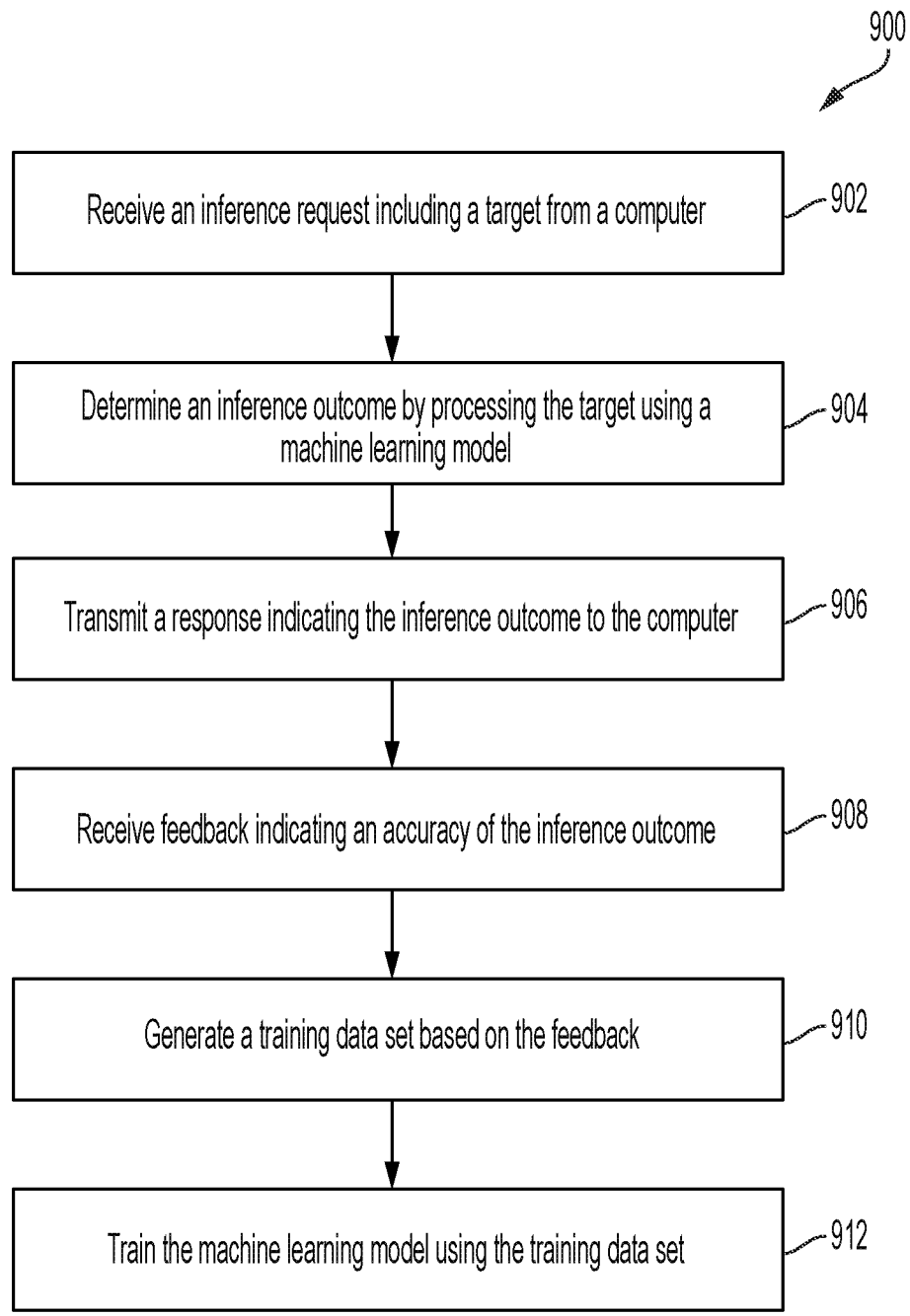
FIG. 9 is a flowchart showing examples of methods for processing an inference request and updating a machine learning model using an MLAAS system in accordance with the present disclosure.

To further describe some embodiments in greater detail, reference is next made to examples of methodologies, techniques, or the like that may be performed by or using an MLAAS system. FIG. 9 is a flowchart showing examples of a method 900 for processing an inference request and updating a machine learning model using an MLAAS system. FIG. 7 is a flowchart showing examples of a method 700 for enhancing features for processing an inference request and updating a machine learning model using an MLAAS system.

The method 900 and/or the method 700 can be executed using computing devices, such as the systems, hardware, and software described with respect to FIGS. 1-5. The method 900 and/or the method 700 can be performed, for example, by executing a machine-readable program or other computer-executable instructions, such as routines, instructions, programs, or other code. The operations of the method 900, the method 700 and/or one or more other techniques, methods, processes, algorithms, or the like described in connection with the embodiments disclosed herein can be implemented directly in hardware, firmware, software executed by hardware, circuitry, or a combination thereof.

For further explanation, the methods 900 and 700 are both depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method, technique, or the like in accordance with the disclosed subject matter.

Referring first to FIG. 9, the method 900 for processing an inference request and updating a machine learning model using an MLAAS system is shown. At 902, an inference request is received from a computer. The inference request includes a target defining a set of features related to a task to be processed by the MLAAS system. The computer may be a computer used for a software product supported by a cognitive processes system of the MLAAS system. Alternatively, the computer may be a client associated with a software product supported by the cognitive processes system. The inference request can be received in an API call made to the cognitive processes system. The inference request may further include a request identifier for uniquely identifying the inference request and the contents thereof.

At 904, an inference outcome is determined by processing the target using one or more machine learning models. Determining the inference outcome can include generating a plurality of candidate inference outcomes based on different processing of the target using one or more of the machine learning models identified by the inference request. A selection strategy can then be used to select one of the candidate inference outcomes as the inference outcome. For example, the selection strategy can be a maximum likelihood estimation or a multi-arm bandit approach.

At 906, a response indicating the inference outcome is transmitted to the computer from which the inference request was received. At 908, after transmitting the response to the computer, feedback is received from the computer. That is, a user of the computer may compare the inference outcome against real-world outcomes of the task for which the inference request was made. The accuracy of the inference outcome can be measured according to the results of those comparisons. The feedback includes an outcome that indicates an accuracy of the inference outcome with respect to the task for which the inference request was made. The feedback can be received in an API call made to the cognitive processes system. The feedback can include the request identifier and an outcome indicating the accuracy of the inference outcome with respect to the task. The feedback can be associated with the inference request using the request identifier.

At 910, a training data set is generated based on the feedback. The training data set includes the outcome and the request identifier as indicated in the feedback. The training data set may also include one or more features used to determine the outcome, such as features of particular relevance to the task underlying the inference request.

At 912, the one or more machine learning models used to determine the inference outcome are trained using the training data set. Training a machine learning model using the training data set can include identifying a version of the machine learning model used to generate the inference outcome based on the request identifier and training the identified version of the machine learning model using the outcome. In this way, the training of a given machine learning model is limited to using data resulting from an inference performed using the given machine learning model.

In some embodiments, the method 900 includes enhancing one or more features of the set of features before the inference request is received by the cognitive processes system. For example, an enhancement system of the MLAAS system can receive the inference request first and enhance it by adding features to the target. Enhancing the one or more features can include determining, based on the model identifier indicated in the inference request, to use one or more additional features for processing the inference request, wherein the one or more additional features are related to the one or more features. The one or more additional features can then be retrieved from one or more data sources and included within the set of features to result in an enhanced target. The enhancement system may then provide the enhanced target to the cognitive processes system to process the inference request.

Figure 10:
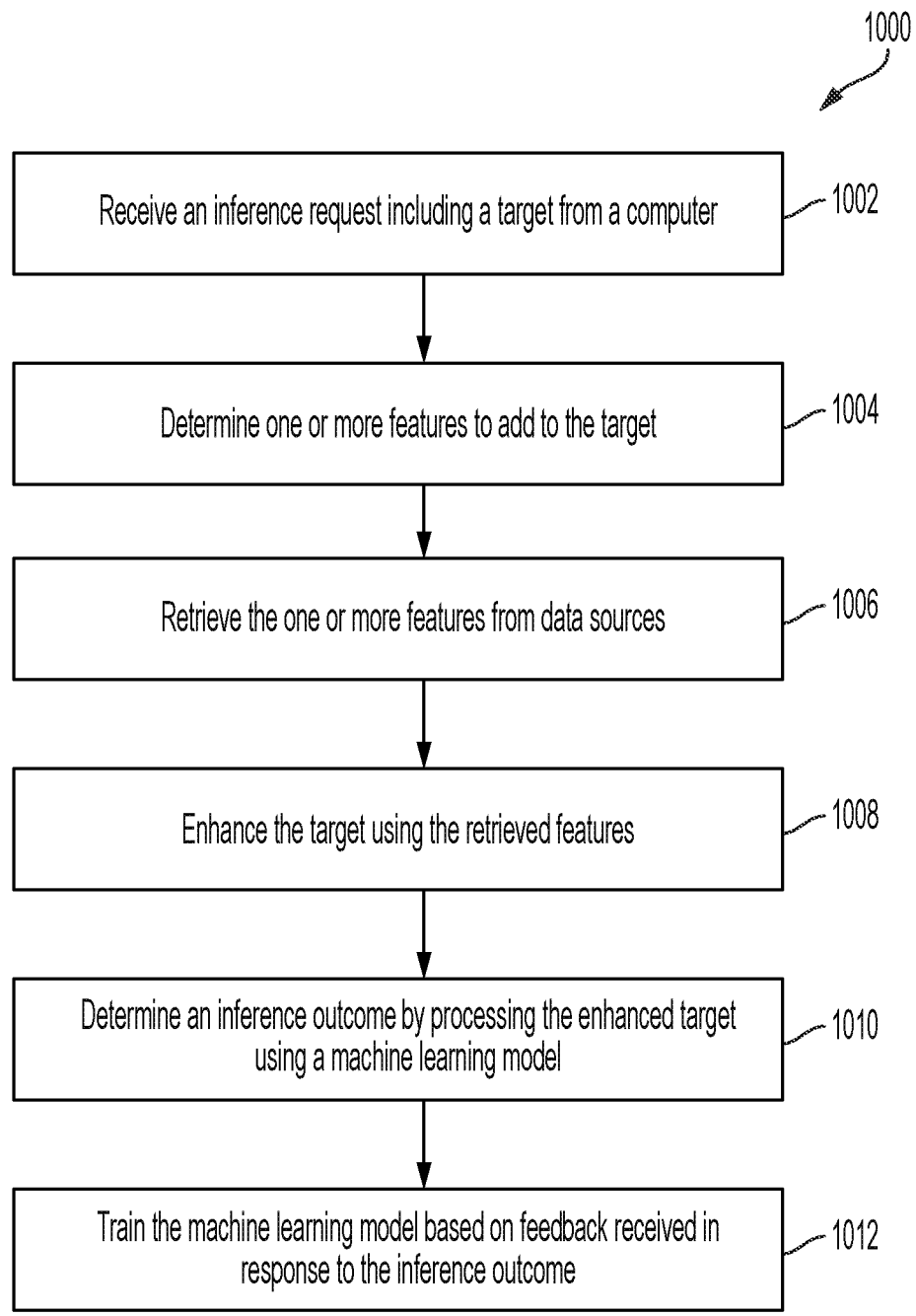
FIG. 10 is a flowchart showing examples of methods for enhancing features for processing an inference request and updating a machine learning model using an MLAAS system in accordance with the present disclosure.

Referring next to FIG. 10, the method 1000 for enhancing features for processing an inference request and updating a machine learning model using an MLAAS system is shown. At 1002, an inference request is received from a computer. The inference request includes a target defining a set of features related to a task to be processed by the MLAAS system. The computer may be a computer used for a software product supported by the MLAAS system. Alternatively, the computer may be a client associated with a software product supported by the MLAAS system. The inference request can be received in an API call made to the MLAAS system. The inference request may further include a request identifier for uniquely identifying the inference request and the contents thereof. Specifically, the inference request is received by an enhancement system of the MLAAS system.

At 1004, one or more additional features to add to the target are determined. The one or more additional features can be determined based on the machine learning models associated with the model identifier of the inference request. Alternatively, the one or more additional features can be determined based on information associated with the features of the target and the task underlying the inference request. For example, where the target includes a set of features with user identifiers and the task relates to determining a number of the users who will become customers within a certain amount of time, the additional features may refer to past accounts or engagements with those users, indications of business dealings with those users, and the like.

At 1006, the one or more additional features are retrieved from one or more data sources. The one or more data sources may include at least one of a proprietary data store, a third-party data store, or another data source. Retrieving the additional features from the data sources can include the enhancement system querying the data sources based on the additional features. The queries can be structured according to the database management systems or other systems used to manage the data sources. Depending on whether a data source is internal to an application system which includes the software product or client from which the inference request was received, the enhancement system may or may not need to obtain access permissions before retrieving the additional features from that data source.

At 1008, the target is enhanced using the retrieved features. Enhancing the target using the retrieved features includes adding those features to the set of features already defined by the target. The enhanced target can then be provided from the enhancement system to the cognitive processes system of the MLAAS system.

At 1010, an inference outcome is determined by processing the enhanced target using one or more machine learning models. Determining the inference outcome can include generating a plurality of candidate inference outcomes based on different processing of the enhanced target using one or more of the machine learning models identified by the inference request. A selection strategy can then be used to select one of the candidate inference outcomes as the inference outcome. For example, the selection strategy can be a maximum likelihood estimation or a multi-arm bandit approach.

At 1012, the one or more machine learning models used to determine the inference outcome are trained using a training data set generated based on feedback to the inference outcome. That is, the inference outcome can be transmitted back to the client or software product from which the inference request was received. Thereafter, the client or software product can transmit feedback including an outcome that can indicate an accuracy of the inference outcome with respect to the task for which the inference request was made. The feedback can be received in an API call made to the cognitive processes system. The feedback can include the request identifier and an outcome indicating the accuracy of the inference outcome with respect to the task. The feedback can be associated with the inference request using the request identifier.

A training data set can then be generated based on the feedback. The training data set includes the outcome and the request identifier as indicated in the feedback. The training data set may also include one or more features used to determine the outcome, such as features of particular relevance to the task underlying the inference request. The one or more machine learning models used to determine the inference outcome are trained using the training data set. Training a machine learning model using the training data set can include identifying a version of the machine learning model used to generate the inference outcome based on the request identifier and training the identified version of the machine learning model using the outcome.

Figure 11:
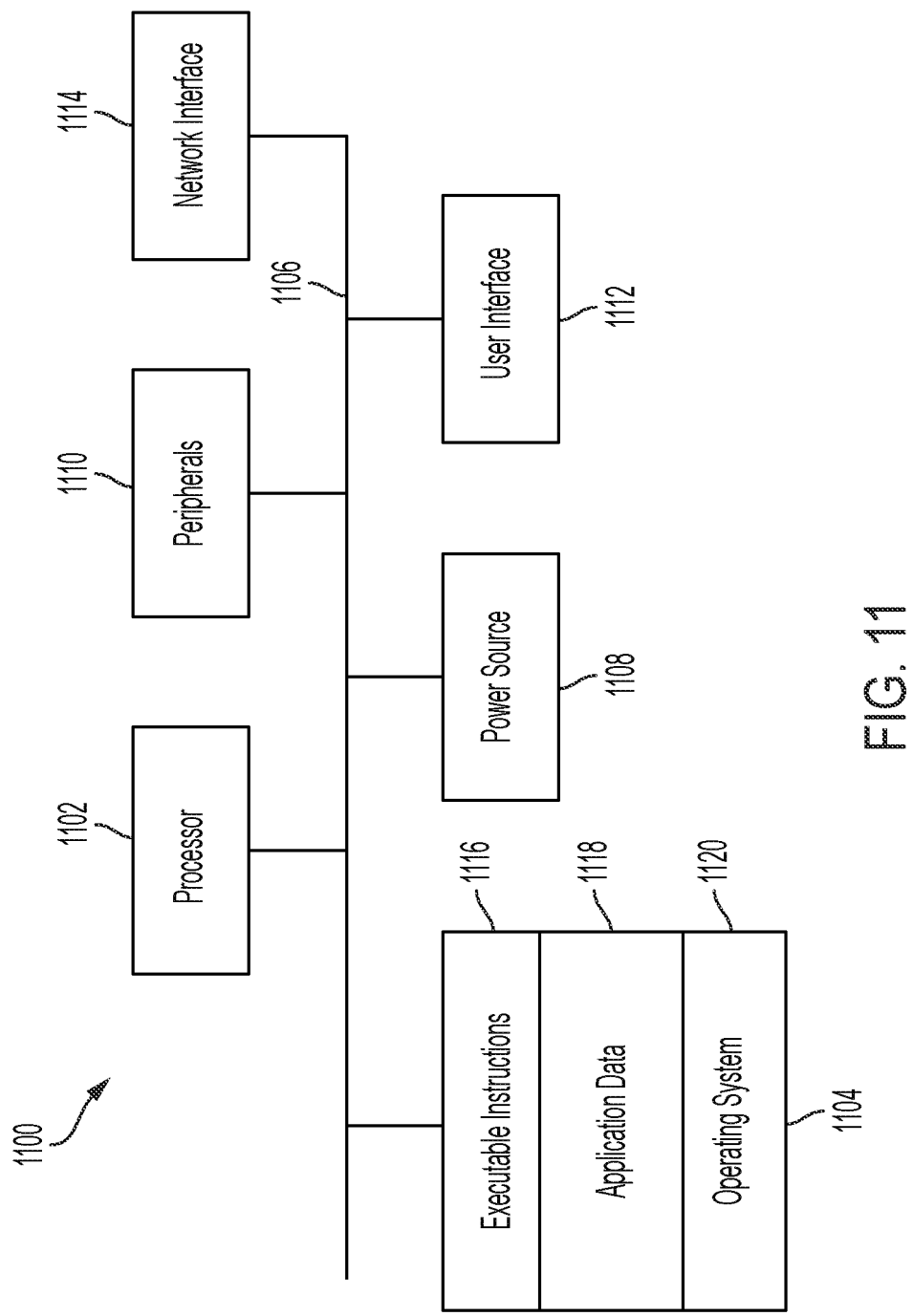
FIG. 11 is a block diagram showing examples computing device that may be used to implement an MLAAS system in accordance with the present disclosure.

FIG. 11 is a block diagram showing examples of computing device 1100. The computing device 1100 may be used to implement an MLAAS system, for example, the MLAAS system 300 shown in FIG. 3 or another MLAAS system. Alternatively, the computing device 1100 may be used to implement a client, for example, as one of the client devices 302 shown in FIG. 3. As a further alternative, the computing device 1100 may be used as another client device, server device, or computer according to the embodiments disclosed herein.

The computing device 1100 includes components or units, such as a processor 1102, a memory 1104, a bus 1106, a power source 1108, peripherals 1110, a user interface 1112, and a network interface 1114. One or more of the memory 1104, the power source 1108, the peripherals 1110, the user interface 1112, or the network interface 1114 can communicate with the processor 1102 via the bus 1106.

The processor 1102 is a central processing unit, such as a microprocessor, and can include single or multiple processors having single or multiple processing cores. Alternatively, the processor 1102 can include another type of device, or multiple devices, now existing or hereafter developed, configured for manipulating or processing information. For example, the processor 1102 can include multiple processors interconnected in any manner, including hardwired or networked, including wirelessly networked. For example, the operations of the processor 1102 can be distributed across multiple devices or units that can be coupled directly or across a local area or other suitable types of network. The processor 1102 can include a cache, or cache memory, for local storage of operating data or instructions.

The memory 1104 includes one or more memory components, which may each be volatile memory or non-volatile memory. For example, the volatile memory of the memory 1104 can be random access memory (RAM) (e.g., a DRAM module, such as DDR SDRAM) or another form of volatile memory. In other examples, the non-volatile memory of the memory 1104 can be a disk drive, a solid-state drive, flash memory, phase-change memory, or another form of non-volatile memory configured for persistent electronic information storage. The memory 1104 may also include other types of devices, now existing or hereafter developed, configured for storing data or instructions for processing by the processor 1102.

The memory 1104 can include data for immediate access by the processor 1102. For example, the memory 1104 can include executable instructions 1116, application data 1118, and an operating system 1120. The executable instructions 1116 can include one or more application programs, which can be loaded or copied, in whole or in part, from non-volatile memory to volatile memory to be executed by the processor 1102. For example, the executable instructions 1116 can include instructions for performing some or all of the methodologies, techniques, and the like of this disclosure. The application data 1118 can include user data, database data (e.g., database catalogs or dictionaries), or the like. The operating system 1120 can be, for example, Microsoft Windows®, Mac OS X®, or Linux®; an operating system for a small device, such as a smartphone or tablet device; or an operating system for a large device, such as a mainframe computer.

The power source 1108 includes a source for providing power to the computing device 1100. For example, the power source 1108 can be an interface to an external power distribution system. In other examples, the power source 1108 can be a battery, such as where the computing device 1100 is a mobile device or is otherwise configured to operate independently of an external power distribution system.

The peripherals 1110 includes one or more sensors, detectors, or other devices configured for monitoring the computing device 1100 or the environment around the computing device 1100. For example, the peripherals 1110 can include a geolocation component, such as a global positioning system location unit. In other examples, the peripherals can include a temperature sensor for measuring temperatures of components of the computing device 1100, such as the processor 1102.

The user interface 1112 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light-emitting diode display, or other suitable display.

The network interface 1114 provides a connection or link to a network (e.g., the network 310 shown in FIG. 3). The network interface 1114 can be a wired network interface or a wireless network interface. The computing device 1100 can communicate with other devices via the network interface 1114 using one or more network protocols, such as using Ethernet, TCP, IP, power line communication, Wi-Fi, Bluetooth, infrared, GPRS, GSM, CDMA, Z-Wave, ZigBee, another protocol, or a combination thereof.

Embodiments of the computing device 1100 may differ from what is shown and described with respect to FIG. 11. In some embodiments, the computing device 1100 can omit the peripherals 1110. In some embodiments, the memory 1104 can be distributed across multiple devices. For example, the memory 1104 can include network-based memory or memory in multiple clients or servers performing the operations of those multiple devices. In some embodiments, the application data 1118 can include functional programs, such as a web browser, a web server, a database server, another program, or a combination thereof.

Figure 12:
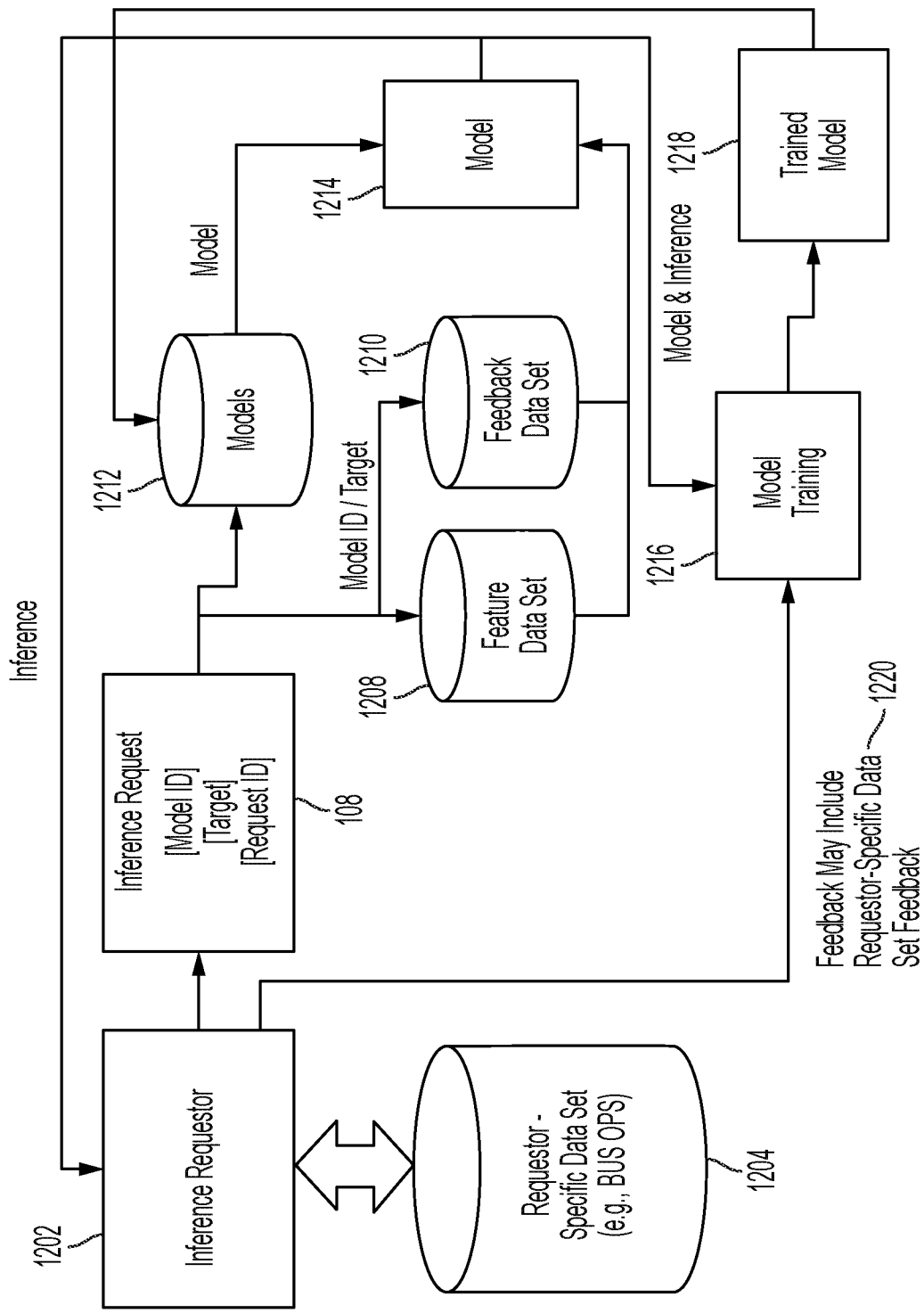
FIG. 12 is a block diagram showing examples system for processing an inference request without access to a requestor-specific database in accordance with the present disclosure.

FIG. 12 depicts example embodiments in which a machine learning model is built for processing an inference request without access to a database of the requestor. In embodiments, an information technology system, such as an MLAAS system as described herein may be configured to build a machine learning model to facilitate machine learning for performing a task of a customer without having access to specifics of the customer, such as having access to a customer-owned database.

In embodiments, an inference requestor 1202 may have access to a requestor specific data set 1204, such as a business operations data set, customer list, and the like. The inference requestor 1202 may prepare an inference request 108 that may include a target and request ID as described elsewhere herein. The inference request 108 may further optionally include a model ID that may identify a machine learning model that can be selected from a data set of machine learning models 1212. By way of these examples, this model ID may be provided by the inference requestor 1202 or may be determined by the MLAAS system 200 based on aspects of the request, such as the request ID, the target details, the task to be evaluated, and the like. However determined, a model 1214 for use by the cognitive processes system 202 may be selected from the model data set 1212 based on only the information in the request 108. In embodiments, the target and optionally the model ID may be used by the MLAAS system 200 to retrieve features (e.g., from feature data set 1208, and the like) and/or feedback data (e.g., from feedback data set 1210, and the like) known to the MLAAS system 200 to facilitate at least one of generating an inference with a model from the model data set 1212 or training the model from the model data set 1212. In embodiments, the inference may be generated and transmitted to the inference requestor 1202 where it may be processed and used to generate feedback 1220, such as requestor-specific data set feedback (optional) to be used for training 1216 the model 1214. In this way, the model 1214, which may be configured for a type of task (e.g., an email related task) may rely on the learning from the feedback 1220 for developing an understanding of aspects of the requestor business and the like without first needing to be configured with requestor-specific data 1204 and the like. In embodiments, a trained model 1218 may be used for further learning, such as by processing a subsequent inference request from the same requestor and the like. In this way, an inference requestor 1202 does not have to perform data culling of their data set 1204 to avoid, for example, providing old, stale information. While a business may desire to retain this information (e.g., customer historical transaction data), the machine learning model generation and training system may, in embodiments, operate without being impacted by this older information and without the inference requestor 1202 having to provide resources to selecting which data in the data set 1204 to hold back, and the like. This process, therefore, releases the inference requestor 1202 from having to become an expert on the machine learning process simply to gain the benefits of machine learning for their business operations.

FIG. 13 depicts exemplary embodiments in which an MLAAS system 200 is enhanced with and/or facilitates improved with use of an a/b testing system. The MLAAS system 200 may enhance A/B testing through use of the inference selection strategy and the like described elsewhere herein and provide learning-based insights regarding two cases to test in an A/B testing model. The MLAAS system may integrate features of A/B testing, such as promoting one of the two (A or B) cases to collect data on, for example, acceptance of the promoted case. This can be accomplished by including an A/B testing selection strategy for selecting which of a plurality of inferences to transmit for use in task evaluation as described herein. As an objective of A/B testing is to determine which of two cases produces more favorable results, feedback in the MLAAS system described herein may be used as input to the inference selection strategy; thereby, using learning from the feedback to accomplish this A/B testing objective. If feedback of a selected inference over time indicates the inference produces desirable results, the inference may, in embodiments, be selected more often. Additionally, the inference may be refined by the feedback; thereby not only providing benefits of A/B testing but also further improving performance through learning methodologies, techniques, and the like, such as machine learning and the like. In the embodiments depicted in FIG. 13, the cognitive processes system 202 may produce a plurality of inferences at 1302 using, for example, different models with a given target or various features for a given model or a combination thereof. The set of inferences produced at 1302 may be processed at 1304 with a selection strategy to select a subset of inferences. At 1306, the subset of inference may be tested, such as by capturing feedback on use of each inference that may indicate with of the subset (e.g., which case in an A/B set of inferences is preferred) and optionally retraining a model that produced the inference to improve further the inferences to be tested. In embodiments, based on the captured feedback, in step 1308 one of the machine learning models (e.g., if a plurality of models were used in step 1302) for reinforcing training based on the feedback.

Example use cases for the embodiments of the MLAAS system disclosed herein are now described. In a first use case example, the MLAAS system can be deployed for improving document and record search results, such as for content strategy solution. A task underlying an inference request may ask how to improve the likelihood that a search result will be interacted with by a platform user. The MLAAS system can receive an inference request indicating to use a search-related machine learning model and a target defining features such as queries that may be entered into a search bar, the search history of one or more platform users, the website from which a search is made, and the like. The MLAAS system processes those features against the identified search-related model to determine an inference outcome which suggests that a search result with any of a list of terms will result in an increased likelihood of interaction. The MLAAS system can later receive feedback indicating whether users clicked on the search results which included one or more of those terms. That feedback can then be used to further train the search-related model.

In another use case example, the MLAAS system can be deployed for predictive lead scoring. For example, predictive lead scoring can refer to separately scoring leads for users and for contexts. The inference request received can relate to the task of determining a likelihood that a particular user of a platform will make a purchase for some product or service. The target included in the inference request can include features of past user activity, an indication of whether the user has used the platform within a recent time period, an indication of whether the user has opted out of marketing emails, a number of responses to previous emails received from the user, and the like. The MLAAS system can use a multi-arm bandit approach to determine the inference outcome. For example, the multi-arm bandit approach may explore several different options to determine possible scores for the user. The option (e.g., the candidate inference outcome) having the highest score based on the processing using the appropriate machine learning model can indicate the likelihood of that user making the subject purchase. Later, feedback indicating whether the user made the subject purchase can be received by the MLAAS system and used to train the applicable machine learning model.

In another use case example, the MLAAS system can be deployed for send-time optimization, such as to determine an optimal time at which to send an email or to determine a time at which emails should be sent to result in an increased read or response rate. This send-time optimization task can be implemented using automated batch email management, such as which may use an embodiment of the MLAAS systems disclosed herein to train a machine learning model to optimize the send time of a batch of emails. For example, the MLAAS system may use a model that determines how and when batches of emails have been sent and consider the read and response rates for those batches of emails. The MLAAS system may further enhance the features provided, such as based on data sources including survey data for improving email recipient read and response rates. The accuracy of the inference outcome indicating the time to send an email can be measured based on the actual read and response rates for the email. The accuracy or inaccuracy of the inference outcome may then be used to generate a training data set for training the machine learning model, such as to improve the modeling for a next task.

The embodiments of this disclosure can be described in terms of functional block components and various processing operations. Such functional block components can be realized by a number of hardware or software components that perform the specified functions. For example, the disclosed embodiments can employ various integrated circuit components (e.g., memory elements, processing elements, logic elements, look-up tables, and the like), which can carry out a variety of functions under the control of one or more microprocessors or other control devices. Similarly, where the elements of the disclosed embodiments are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the embodiments of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc.

Likewise, the terms "system" or "mechanism" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Embodiments or portions of embodiments of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Detailed embodiments of the present disclosure are disclosed herein; however, it is to be understood that the disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having," as used herein, are defined as comprising (i.e., open transition).

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer-readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable the execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including clients, other servers, printers, database servers, print servers, file servers, communication servers, distributed servers, social networks, and the like. Additionally, this coupling and/or connection may facilitate remote execution of the program across the network. The networking of some of these devices or all these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including servers, other clients, printers, database servers, print servers, file servers, communication servers, distributed servers and the like. Additionally, this coupling and/or connection may facilitate remote execution of the program across the network. The networking of two or more of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, smart phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another.

The methods and systems described herein may also transform data representing physical and/or intangible items from one state to another.

The elements described and depicted herein, including in flowcharts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, smart phones other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flowchart and block diagrams or any other logical component may be implemented on a machine capable of executing program instructions. Thus, while the foregoing drawings and descriptions set forth functional aspects of the disclosed systems, no specific arrangement of software for implementing these functional aspects should be inferred from these descriptions unless explicitly stated or otherwise clear from the context. Similarly, it will be appreciated that the various steps identified and described above may be varied, and that the order of steps may be adapted to specific applications of the techniques disclosed herein. All such variations and modifications are intended to fall within the scope of this disclosure. As such, the depiction and/or description of an order for various steps should not be understood to require a specific order of execution for those steps, unless required by a specific application, or explicitly stated or otherwise clear from the context.

The methods and/or processes described above, and steps associated therewith, may be realized in hardware, software or any combination of hardware and software suitable for a specific application. The hardware may include a general-purpose computer and/or dedicated computing device or specific computing device or specific aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above, and combinations thereof may be embodied in computer executable code that, when executing on one or more computing devices, performs the steps thereof. In another aspect, the methods may be embodied in systems that may perform the steps thereof and may be distributed across devices in a number of ways; or all of the functionality may be integrated into a dedicated, standalone device or other hardware. In another aspect, the mechanisms and methodologies for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of one or more examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiments, method, and examples herein. The disclosure should therefore not be limited by the above described embodiments, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). Specifically, any use of "step of" in the claims is not intended to invoke the provision of 35 U.S.C. § 112(f).

Persons skilled in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

What is claimed is:

1. A method, comprising:
   receiving an inference request including a model identifier and a target defining a set of features for use in processing the inference request, wherein the set of features correspond to a task for evaluation using a machine learning model associated with the model identifier;
   determining based on the model identifier an additional feature, related to the set of features, for processing the inference request;
   generating an inference outcome corresponding to the inference request being processed using the target and the additional feature as input to the machine learning model; and
   training the machine learning model based on feedback resulting from the inference outcome, the feedback indicating an accuracy of the inference outcome with respect to the task.

2. The method of claim 1, wherein the feedback indicates a default feedback based on the task.

3. The method of claim 1, wherein the training comprises:
   generating a training data set based upon the inference request and the feedback, wherein the training data set is used to train the machine learning model.

4. The method of claim 1, wherein the inference request is included in an application programming interface (API) call, wherein the API call includes a request identifier for the inference request, the model identifier, and the target.

5. The method of claim 1, comprising:
   using a selection strategy to select one of a plurality of candidate inference outcomes, generated based on different processing of the target using the machine learning model, as the inference outcome.

6. The method of claim 1, comprising:
   using a selection strategy to select one of a plurality of candidate inference outcomes, generated based on different processing of the target using the machine learning model, as the inference outcome, wherein the selection strategy is a maximum likelihood estimation used to select the inference outcome based on the inference outcome having a highest score amongst the plurality of candidate inference outcomes.

7. The method of claim 1, comprising:
   using a selection strategy to select one of a plurality of candidate inference outcomes, generated based on different processing of the target using the machine learning model, as the inference outcome, wherein the selection strategy is a multi-arm bandit approach used to select the inference outcome based on a distribution of values of each of the plurality of candidate inference outcomes after a number of inference iterations are completed.

8. The method of claim 1, comprising:
   limiting the training of the machine learning model to data from an inference perform using the machine learning model based upon the inference request.

9. The method of claim 1, comprising:
   selectively training a version of the machine learning model, used to generate the inference outcome based on a request identifier, using the inference outcome.

10. A non-transitory machine readable medium comprising instructions, which when executed by a machine, causes the machine to perform operations including:
    receiving an inference request including a model identifier and a target defining a set of features for use in processing the inference request, wherein the set of features correspond to a task for evaluation using a machine learning model associated with the model identifier;
    determining based on the model identifier an additional feature, related to the set of features, for processing the inference request;
    generating an inference outcome corresponding to the inference request being processed using the target and the additional feature as input to the machine learning model; and
    training the machine learning model based on feedback resulting from the inference outcome, the feedback indicating a default feedback based on the task.

11. The non-transitory machine readable medium of claim 10, wherein the feedback indicates an accuracy of the inference outcome with respect to the task.

12. The non-transitory machine readable medium of claim 10, the operations including:
    generating a training data set based upon the inference request and the feedback, wherein the training data set is used to train the machine learning model.

13. The non-transitory machine readable medium of claim 10, wherein the inference request is included in an application programming interface (API) call, wherein the API call includes a request identifier for the inference request, the model identifier, and the target.

14. The non-transitory machine readable medium of claim 10, the operations including:
    using a selection strategy to select one of a plurality of candidate inference outcomes, generated based on different processing of the target using the machine learning model, as the inference outcome.

15. The non-transitory machine readable medium of claim 10, the operations including:
    using a selection strategy to select one of a plurality of candidate inference outcomes, generated based on different processing of the target using the machine learning model, as the inference outcome, wherein the selection strategy is a maximum likelihood estimation used to select the inference outcome based on the inference outcome having a highest score amongst the plurality of candidate inference outcomes.

16. The non-transitory machine readable medium of claim 10, the operations including:
    using a selection strategy to select one of a plurality of candidate inference outcomes, generated based on different processing of the target using the machine learning model, as the inference outcome, wherein the selection strategy is a multi-arm bandit approach used to select the inference outcome based on a distribution of values of each of the plurality of candidate inference outcomes after a number of inference iterations are completed.

17. The non-transitory machine readable medium of claim 10, the operations including:

limiting the training of the machine learning model to data from an inference perform using the machine learning model based upon the inference request.

18. A computing device comprising:

a memory comprising machine executable code for performing a method; and a processor coupled to the memory, the processor configured to execute the machine executable code to cause the processor to perform operations including:

receiving an inference request including a model identifier and a target defining a set of features for use in processing the inference request, wherein the set of features correspond to a task for evaluation using a machine learning model associated with the model identifier;

determining based on the model identifier an additional feature, related to the set of features, for processing the inference request;

generating an inference outcome corresponding to the inference request being processed using the target and the additional feature as input to the machine learning model; and training the machine learning model based on feedback resulting from the inference outcome, the feedback indicating an accuracy of the inference outcome with respect to the task.

19. The computing device of claim 18, the operations including:

using a selection strategy to select one of a plurality of candidate inference outcomes, generated based on different processing of the target using the machine learning model, as the inference outcome, wherein the selection strategy is a maximum likelihood estimation used to select the inference outcome based on the inference outcome having a highest score amongst the plurality of candidate inference outcomes.

20. The computing device of claim 18, the operations including:

using a selection strategy to select one of a plurality of candidate inference outcomes, generated based on different processing of the target using the machine learning model, as the inference outcome, wherein the selection strategy is a multi-arm bandit approach used to select the inference outcome based on a distribution of values of each of the plurality of candidate inference outcomes after a number of inference iterations are completed.

* * * * *